(12) United States Patent
Shivapurkar et al.

(10) Patent No.: US 11,792,448 B2
(45) Date of Patent: *Oct. 17, 2023

(54) CONTENT MANAGEMENT IN OVER-THE-TOP SERVICES

(71) Applicant: Microsoft Technology Licensing, LLC, Redmond, WA (US)

(72) Inventors: Radhika Shivapurkar, Woodland Hills, CA (US); Eric Hoffert, New York, NY (US); Joel Korpi, Jersey City, NJ (US); Matthew Kendall, Denver, PA (US); Jaiminkumar Panchal, King of Prussia, PA (US); Aadesh Patel, Edison, NJ (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,812

(22) Filed: Apr. 21, 2022

(65) Prior Publication Data

US 2022/0248068 A1 Aug. 4, 2022

Related U.S. Application Data

(63) Continuation of application No. 17/149,275, filed on Jan. 14, 2021, now Pat. No. 11,343,547, which is a
(Continued)

(51) Int. Cl.
*H04N 21/234* (2011.01)
*H04N 21/433* (2011.01)
(Continued)

(52) U.S. Cl.
CPC ... *H04N 21/23424* (2013.01); *G06Q 30/0275* (2013.01); *H04N 21/4331* (2013.01); *H04N 21/812* (2013.01)

(58) Field of Classification Search
CPC .......... G06Q 30/0275; G06Q 30/0601; G06Q 30/0241; G06Q 30/0277; G06Q 30/0243; H04N 21/26283; H04N 21/2456; H04N 21/2405; H04N 21/23424; H04N 21/4331; H04N 21/812; H04N 21/442; H04N 21/252; H04N 21/4667; H04N 21/482;
(Continued)

(56) References Cited

U.S. PATENT DOCUMENTS 10,262,337 B2 4/2019 Nolet et al.
2010/0268603 A1 10/2010 Nolet et al.
(Continued)

*Primary Examiner* — Yassin Alata
(74) *Attorney, Agent, or Firm* — CALFEE, HALTER & GRISWOLD LLP

(57) ABSTRACT

Aspects of the subject disclosure may include, for example, determining an ad play list for an Over-The-Top video stream requested by an end user device based on a price and/or a category of a creative derived from auctions with multiple Supply-Side Platform servers. The ad play list can be determined for the ad pod according to business rules, which can include a yield policy based on increasing revenue for a publisher of the video stream, and/or which can include a competitive separation policy enforced based on the category for bid responses. Other embodiments are disclosed.

20 Claims, 12 Drawing Sheets

Related U.S. Application Data continuation of application No. 16/560,666, filed on Sep. 4, 2019, now Pat. No. 10,924,778.

(51) Int. Cl.
*G06Q 30/0273* (2023.01)
*H04N 21/81* (2011.01)

(58) Field of Classification Search
CPC .... H04N 21/25; H04N 21/251; H04N 21/258; H04N 21/25808; H04N 21/25866; H04N 21/25883; H04N 21/25891; H04N 21/44213; H04N 21/44222; H04N 21/45; H04N 21/4508; H04N 21/4532; H04N 21/458; H04N 21/466; H04N 21/4661; H04N 21/4662; H04N 21/4663; H04N 21/4665; H04N 21/4666; H04N 21/4668

USPC ............................................ 705/14.41, 14.46
See application file for complete search history.

(56) References Cited

U.S. PATENT DOCUMENTS

| 2011/0029373 A1* | 2/2011 | Steelberg ............... G06Q 30/02 |
| | | 705/14.41 |
| 2014/0108159 A1 | 4/2014 | Hughes et al. |
| 2015/0332312 A1 | 11/2015 | Cosman |
| 2016/0275570 A1 | 9/2016 | Seljan et al. |
| 2017/0169128 A1* | 6/2017 | Batchu Krishnaiahsetty ............. |
| | | H04N 21/8456 |
| 2021/0067820 A1 | 3/2021 | Shivapurkar et al. |
| 2021/0136427 A1 | 5/2021 | Shivapurkar et al. |

* cited by examiner

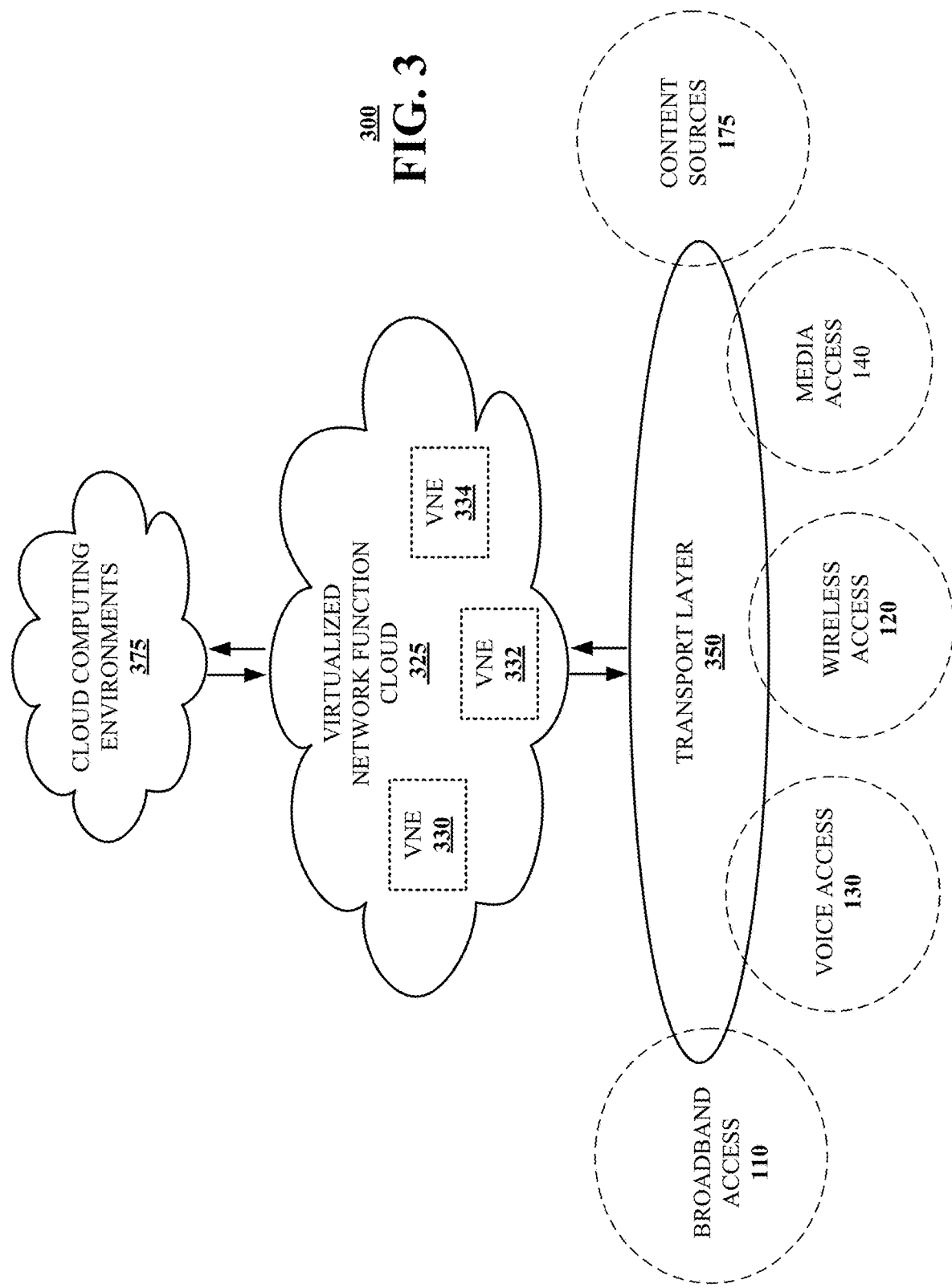

exemplary embodiments for Programmatic OTT with Pre-
CONTENT MANAGEMENT IN OVER-THE-TOP SERVICES

CROSS-REFERENCE TO RELATED APPLICATIONS

This application is a continuation of and claims priority to U.S. patent application Ser. No. 17/149,275, filed Jan. 14, 2021, which is a continuation of and claims priority to U.S. patent application Ser. No. 16/560,666, filed Sep. 4, 2019, now U.S. Pat. No. 10,924,778, issued Feb. 16, 2021. The contents of the foregoing are hereby incorporated by reference into this application as if set forth herein in full.

FIELD OF THE DISCLOSURE

The subject disclosure relates to content management in Over-The-Top (OTT) services.

BACKGROUND

As the habits and behavior of content viewers continue to evolve, advertisers seek to reach their audiences in operationally efficient ways. Digital advertising can be a fragmented and inefficient process depending on the type of media service delivering the content.

Advertisers continue to desire the enforcement of ad frequency management, brand safety standards, and competitive separation regardless of how an ad is sold, trafficked, and delivered. Publishers desire to increase or maximize the yield efficiency for their ad inventory.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
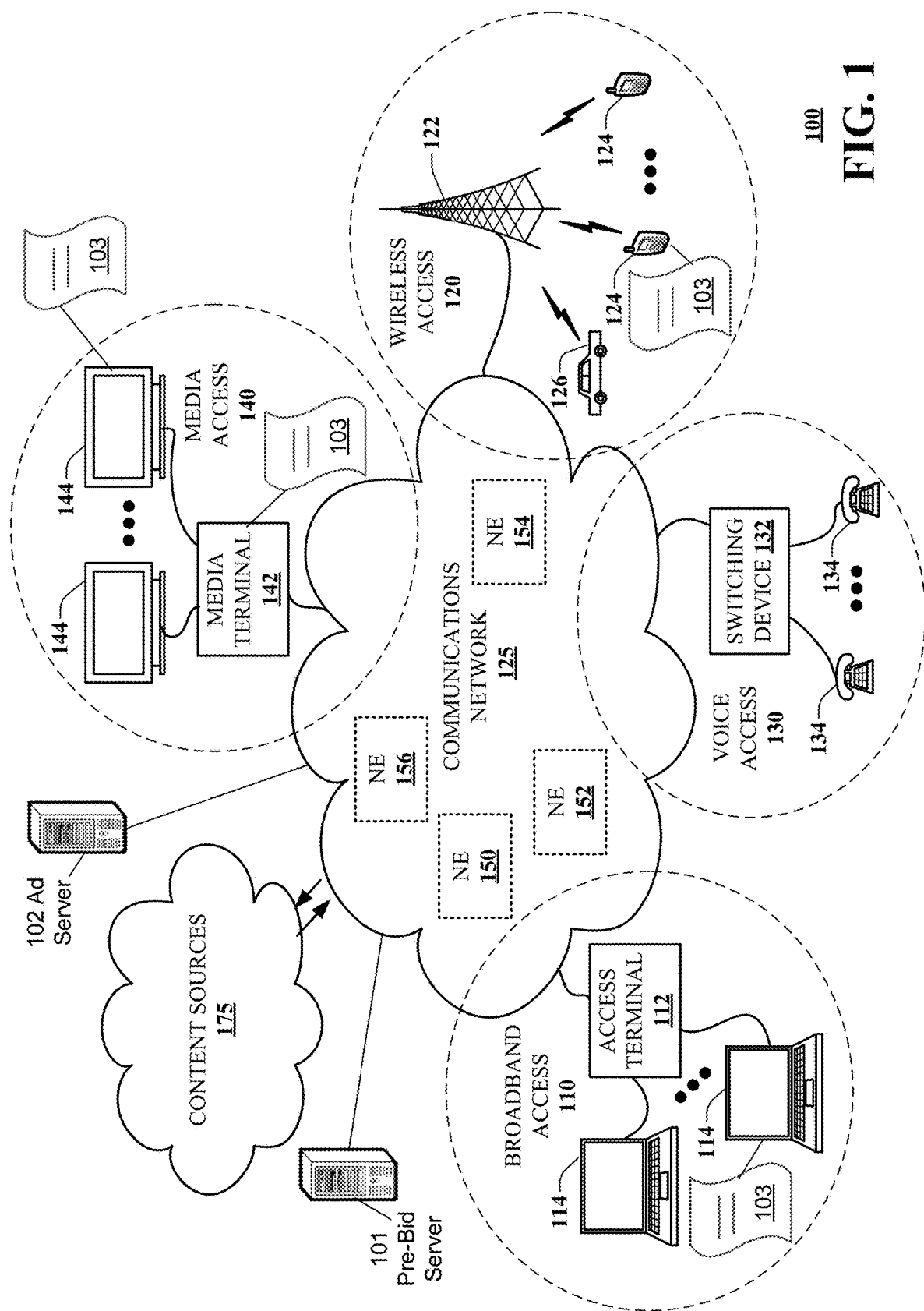
FIG. 1 is a block diagram illustrating an exemplary, non-limiting embodiment of a communications network in accordance with various aspects described herein.

The subject disclosure describes, among other things, illustrative embodiments for Programmatic OTT with Pre-bid (POP) video ad insertion which enables adherence to various policies including competitive separation requirements. One or more of the exemplary embodiments provide a POP video ad insertion process that offers compliance and control comparable with other media services (e.g., TV ad placement) while supporting simultaneous competition for inventory by all programmatic demand. The exemplary embodiments provide for convergence of direct-sold and programmatic campaigns and an increase of maximization of the value of inventory. In one or more embodiments, publishers can pre-agree with, and execute on, reserved delivery commitments with programmatic buyers without compromising control over how their inventory is monetized. Other embodiments are described in the subject disclosure.

One or more aspects of the subject disclosure include a prebid server that can receive, from a Server-Side Ad Insertion (SSAI) server, ad pod information associated with an ad pod of an OTT video stream requested by an end user device. The prebid server can perform prebid auctions with multiple Supply-Side Platform (SSP) servers to obtain bid responses including a price, a category of a creative, and a duration of the creative. Key value pairs for candidate bids can then be transmitted by the prebid server to the SSAI server, where key value pairs are representative of the price, the category, and the duration. An ad server can then determine an ad play list for the ad pod according to business rules that include a yield policy that increases revenue for a publisher of the video stream and include a competitive separation policy.

One or more aspects of the subject disclosure include an ad server that receives, from an SSAI server, key value information associated with candidate bid responses for an ad pod of an OTT video stream requested by an end user device. The key value information is representative of a price, a category of a creative, and a duration of the creative for candidate bid responses obtained by a prebid server during prebid auctions with multiple SSP servers. The ad server can determine an ad play list for the ad pod according to business rules which include yield policy based on increasing revenue for a publisher of the video stream and including a competitive separation policy enforced by the ad server based on the category for each of the candidate bid responses. The ad server can transmit, to the SSAI server, ad play list information for the ad pod to cause the SSAI server to stitch content of the video stream with creatives from the ad play list into the ad pod.

One or more aspects of the subject disclosure include an end user device or a computer-readable storage medium of the end user device that conducts prebid auctions with multiple SSP servers for an ad of an OTT video stream requested by the end user device. Candidate bid responses can be obtained from one or more of the SSP servers, where each of the candidate bid responses identify a creative and include a price and a category of the creative. The candidate bid responses can be stored in a prebid cache server and mapped to corresponding unique cache identifications. An ad server tag URL can be generated based on combining an existing video ad server tag with key value pairs obtained from the candidate bid responses, where the key value pairs represent the price and duration of each of the candidate bid responses. The ad server tag URL can be utilized for transmitting a request to an ad server, where the request is for an ad play list to populate the ad pod. The ad server determines the ad play list according to pre-configured line items and business rules including a yield policy and a competitive separation policy. The ad server can provide ad play list information to the end user device to enable obtaining creatives in the ad play list including at least one creative from the prebid cache server based on a unique cache identification. The creatives are then rendered in the ad pod.

In one embodiment, a method includes transmitting, by a processing system including a processor over a network, bid requests to a plurality of SSP servers, where the bid requests are based on ad pod information associated with an ad pod of a video stream requested by an end user device, and where the video stream is requested as an OTT media service. The processing system can receive, over the network within a time deadline, bid responses from one or more of the plurality of SSP servers, where each of the bid responses include a price, a category of a creative, and a duration of the creative. The processing system can select candidate bid responses from among the bid responses according to the price of each of the bid responses. The processing system can transmit, over the network, key value pairs representative of the price, the category, and the duration for each of the candidate bid responses. The transmitting of the key value pairs can enable an ad server to determine an ad play list for the ad pod of the video stream according to business rules. The business rules can include a yield policy that is enforced based on the price for each of the candidate bid responses, where the yield policy is based on increasing revenue for a publisher of the video stream. In another embodiment, the business rules can include a competitive separation policy that is enforced based on the category for each of the candidate bid responses.

In one embodiment, a method can include transmitting, by a processing system including a processor over a network, bid requests to a plurality of SSP servers, where the bid requests are based on ad pod information associated with an ad pod of a video stream requested by an end user device, and where the video stream is requested as an OTT media service. The processing system can receive, over the network within a time deadline, bid responses from one or more of the plurality of SSP servers, where each of the bid responses includes a price, a category of a creative, and a duration of the creative. The processing system can select candidate bid responses from among the bid responses according to the price of each of the bid responses, where the selecting the candidate bid responses enables a determination of an ad play list for the ad pod of the video stream according to business rules. The business rules can include a yield policy that is enforced based on the price for each of the candidate bid responses, where the yield policy is based on increasing revenue for a publisher of the video stream. In another embodiment, the business rules can include a competitive separation policy that is enforced based on the category for each of the candidate bid responses.

In one embodiment, a method can include performing, by a processing system including a processor, a prebid auction to obtain bid responses, where the prebid auction is based on ad pod information associated with an ad pod of a video stream requested by an end user device, where the video stream is requested as an OTT media service, where each of the bid responses includes a price, a category of a creative, and a duration of the creative, and where the processing system is part of a real-time bidding advertising exchange. The method can include selecting, by the processing system, candidate bid responses from among the bid responses according to the price of each of the bid responses, where the selecting the candidate bid responses enables a determination of an ad play list for the ad pod of the video stream according to business rules. The business rules can include a yield policy that is enforced based on the price for each of the candidate bid responses, where the yield policy is based on increasing revenue for a publisher of the video stream. In another embodiment, the business rules can include a competitive separation policy that is enforced based on the category for each of the candidate bid responses.

Referring now to FIG. 1, a block diagram is shown illustrating an example, non-limiting embodiment of a communications network or system 100 in accordance with various aspects described herein. For example, the communications system 100 can facilitate in whole or in part providing prebidding for advertising in various media services including in OTT services such as rendered by a mobile phone, a laptop computer, a smart television, a gaming console, an application executing on a set top box, a vehicle entertainment system, or any end user device in system 100. One or more of the exemplary embodiments can provide POP video ad insertion, such as into an ad pod, through use of a prebid server 101, ad server 102 and/or prebid client-side code or script (e.g., javascript) 103. As described herein, POP ad insertion according to the exemplary embodiments can provide the desired efficiency that comes with programmatic demand to long-form video publishers while maintaining control and brand safety to comply with brand requirements.

Prebidding can include advance bidding or header bidding. In web page examples, when the page loads, header bidding enables publishers to have simultaneous or overlapping in time auctions with all or selected SSPs (which can include ad exchanges). For OTT examples (such as long form video with ad pods, episodes of programs, movies and so forth), prebidding enables publishers to have simultaneous or overlapping in time auctions with all or selected SSPs (including ad exchanges). Publishers can receive bids on their inventory (e.g., ad space in an ad pod) that may be unavailable through their primary ad server and exchange. The returned bids can then be passed into the ad server 102 so they can compete with direct demand and the primary ad server's exchange (e.g., guaranteed buys according to offline agreement with buyers and direct auction bids for auction being conducted by the ad server 102).

Depending on whether a server-side or client-side implementation is to be utilized, the prebid server 101 or the prebid script 103 can communicate with various equipment including SSPs (not shown) and the ad server 102 for enabling POP ad insertion in an ad pod of an OTT video stream, which can include simultaneous or overlapping in time prebid auctions, used in conjunction with direct bids or guaranteed buys. In one or more embodiments, the prebid server 101 can communicate with an SSAI server (not shown) to facilitate the POP ad insertion technique.

In one embodiment, the prebid server 101 or the prebid script 103 can conduct auctions with multiple selected SSPs (including ad exchanges) to collect and determine candidate bids and to store these bids and/or the corresponding creatives (or information enabling access to the creative) in a prebid cache (not shown). The prebid server 101 or the prebid script 103 can obtain category or brand identification for the creatives of the bids (e.g., included by the bidder in the bid response of the prebid auction) and then can provide key value pairs to the ad server 102 (directly or via an SSAI server), such as price, category, and duration information. The ad server 102 can compare the key values to stored line items to find a matching line item and also to compare to other line items that bid on the ad pod/impression(s).

This process enables the ad server 102 to enforce business rules including yield optimization to increase or optimize revenue and competitive separation to prevent competing creatives from appearing in the same ad pod or next to each other in an ad pod, such as in long form video. Based on application of the business rules, the ad server 102 can determine the ad play list for the ad pod. The selected creatives can then be rendered by the video player during the particular ad pod. The creatives can be sourced from the prebid cache (e.g., where a prebid winner is selected by the ad server 102) and/or by the ad server 102 (e.g., where a direct or guaranteed bid winner is selected by the ad server). The ad pod can be populated such as through stitching with content by the SSAI server (not shown) in the SSAI implementation or via a player Software Development Kit (SDK) (not shown) in the Client-Side Ad Insertion (CSAI) implementation.

In one or more embodiments, the ad server 102 can utilize line items for determining winning bids among the prebids, the direct bids and the guaranteed buys. Line items in conjunction with business and/or prioritization rules can enable agreements (e.g., between the publisher and the bidder) to be implemented and enforced (e.g., by an allocation management module executing on the ad server 102 of the publisher), although in other embodiments the allocation management or enforcement of the business rules can be performed by a separate server in communication with the ad server. For example, when a request to fill an available ad slot is received, the ad server 102 can compare the characteristics of the ad slot to the parameters of line items representing the publisher's agreements with buyers. If more than one line item matches the ad request (indicating that more than one creative or ad campaign may be eligible to fill the ad slot), the allocation management module can apply business rules (e.g., prioritization rules) to determine which ad campaign or creative fills the ad slot. The business rules can also be applied by the ad server 102 for populating ad pods so that not only is a revenue yield policy enforced (e.g., maximized or increased) but that competitive separation and/or brand safety rules are adhered to (e.g., preventing competitive creatives from appearing in the same ad pod and/or preventing a creative from appearing in undesired content or in an ad pod with undesired creative(s)).

Communications network 100 enables competitive exclusion in various media services including long form video OTT services, which can include the process of preventing ads in the same industry group from appearing either in the same ad pod or adjacent to each other in the same ad pod. In one embodiment, bidders can include a brand category identification on incoming ad pod bids. The brand category of the bid can be translated by the prebid server 101 or the prebid script 103 to a corresponding brand category used by the ad server 102 of the publisher. This translated brand category can then be used in a bid caching process, as well as targeting keys that are transmitted to the ad server 102 for determining winning bids utilizing line items.

In one or more embodiments, publishers can provide a mapping file accessible to the prebid server 101 or the prebid script 103 that enables converting Interactive Advertising Bureau (IAB) categories and/or sub-categories to the particular labels utilized by their ad server 102. In another embodiment, the prebid server 101 or the prebid script 103 can translate first labels (brands or brand categories) utilized by the bidder to second labels utilized by the ad server 102, which may or may not include translating from the first labels to the IAB categories and then to the second labels. In one or more embodiments, labels can be added to the line items accessible to the ad server 102 to indicate which industries, categories and/or brands will be included in the competitive exclusion. In one or more embodiments, publisher-provided parameters are combined with key values determined from the bid responses to build a video ad tag Uniform Resource Locator (URL) that can be used by a video player.

In one or more embodiments, line items can be created that target prebid key values. In one embodiment, the ad server 102 can include a console or interface that enables inputting objects or specifics in a line item as to what is to be delivered. For instance, the objects or data in the line item can specify particular key values that are being sought. In one embodiment, there can be a link with the line item or the object for a particular creative. In one embodiment, a Video Ad Serving Template (VAST) creative URL is generated that adheres to a particular format which includes the key value(s) passed to the ad server 102 from the prebid script 103 or from the prebid server 101 (via an SSAI server).

The communications network 125 provides broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS)

modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
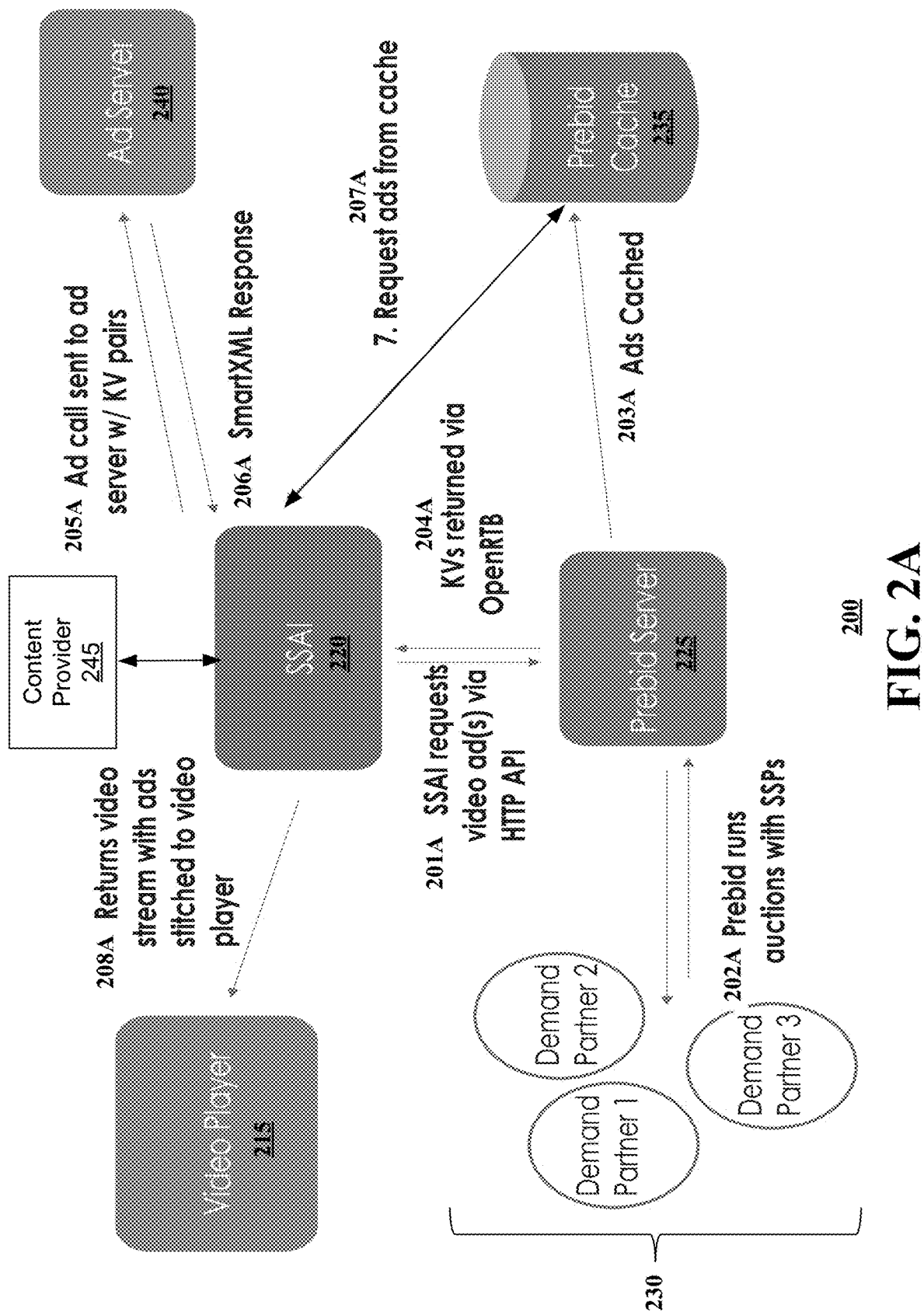
FIG. 2A is a block diagram illustrating an example, non-limiting embodiment of a system functioning within or in conjunction with the communication network of FIG. 1 in accordance with various aspects described herein.

FIG. 2A is a block diagram illustrating an example, non-limiting embodiment of a system 200 that manages advertising insertion including providing prebidding for various types of media services such as OTT video (e.g., video that includes ad pods, long form video, episodes of shows, movies, etc.). System 200 can perform an SSAI implementation. System 200 can function in, or in conjunction with, various communication systems and networks including the communications system 100 of FIG. 1 in accordance with various aspects described herein.

System 200 can provide for SSAI in various formats including long form video in an OTT media service. System 200 includes an SSAI server 220 that can deliver media services to an end user device, which in this example is shown as a video player 215. The system 200 also includes a prebid server 225 that communicates with equipment 230 of one or more Supply-Side Platforms (SSPs) or demand partners, such as advertising networks or exchanges. Prebid server 225 enables publishers to have auctions (e.g., simultaneously or overlapping in time) with all or selected SSPs (including ad exchanges) 230. In this manner, publishers can receive bids on inventory that may be unavailable through a primary ad server and exchange. The returned bids or a portion thereof can then be provided to an ad server 240 to compete with direct demand and the primary ad server's exchange. In one or more embodiments, the prebid auctions can be performed in a particular time frame such as within a few hundred milliseconds (e.g. less than 100 or 200 milliseconds), although, other time frames can be utilized by the exemplary embodiments.

In this example, the SSAI server 220 can determine that a video stream is being requested by the video player 215, such as receiving a request from the video player. The SSAI server 220 can send at 201A a request associated with the video to the prebid server 225. For instance, an HyperText Transfer Protocol (HTTP) Application Programming Interface (API) can be utilized for the request. However, various techniques can be utilized to notify the prebid server 225 to initiate a prebid auction. In one embodiment, the request sent to the prebid server 225 can specify ad pod requirements for the video stream, such as the number of creatives that are being sought. In one or more embodiments, the SSAI server 220 can selectively initiate the prebid auction via the prebid server 225 according to the particular video being requested.

At 202A, the prebid server 225 can conduct or otherwise perform the prebid auctions for obtaining bids and determining candidate bids. For example, the prebid server 225 can send a request for bids to selected demand partners 230 (e.g., competing SSPs/ad exchanges). This can be done in a number of ways including by relaying OpenRTB requests to the SSPs 230. The demand partners or SSPs 230 can return bid responses to the prebid server 225. Candidate bids can then be selected by the prebid server 225 from among the received bids, such as the highest bids overall or the highest bid(s) from each category. The process of determining the candidate bids can be controlled by the publisher such as: selecting the highest bids regardless of category; or selecting the highest bids and excluding duplicate bids from the same category; or selecting a plurality of highest bids from each category, and so forth. In one or more embodiments, a single source can be utilized for clearing bids from multiple SSPs.

The bid responses can include various information including the creative, the price, the category of the creative, the duration of the creative, an identification of the creative or a combination thereof. For instance, a bid response can be transmitted during the prebid auction (e.g., transmitted or received within a particular time period) from one of the SSPs 230 to the prebid server 225 where the response includes the creative, the price, a category of the creative (e.g., a category selected according to the IAB categories), and a duration of the creative.

In one or more embodiments, the prebid server 225 can perform category translation on each received bid and/or on the candidate bids (after they have been identified by the prebid server 225). For instance, the category translation can translate an IAB category (or another category that was used in the bid response and is recognized by the prebid server 225) to a category that is recognizable by the ad server 240, which may or may not be familiar with IAB categories. In one embodiment, a publisher can provide a mapping file accessible to the prebid server 225 to enable converting IAB categories (which can include sub-categories) to the labels utilized by the ad server 240 of the publisher.

In one embodiment, bid responses that do not include a category for the creative can be discarded or otherwise not deemed to be a candidate bid (even if having the highest price) by the prebid server 225. In another embodiment, for bid responses that do not include a category, the prebid server 225 can attempt to determine a category for the creative of the bid response such as based on an identification of the creative included in the bid response, an analysis or pattern recognition of the creative, or according to other metadata such as metadata included with the creative.

In one embodiment at 203A, whether or not category translation is required or performed, the bids and/or the corresponding creatives (or information representative of the creative that allows for access to the creative) can be stored in a prebid cache 235, such as a database accessible to the prebid server 225 and/or accessible to the SSAI server 220. For example, a cache ID can be utilized to facilitate accessing the stored information such as the creative. The particular creative of the bid in the category for a particular user of the video player 215 can be customized according to various factors such as demographics, location, and/or consumption history. In one embodiment, all bids and/or all creatives of the bids that are received can be stored in, or otherwise made accessible via, the prebid cache 235 such as for use for statistical analysis. In another embodiment, only a portion of the bids are stored in the prebid cache 235 such as storing only candidate bids or storing candidate bids along with a portion of the non-candidate bids (e.g., a runner-up bid).

In one or more embodiments, the prebid server 225 can generate key value pairs that are multi-dimensional. For example, the key value pairs can include price, category, and duration values in which example the key is hb_pb_cat_dur and each component of the key name after the hb represents a related value such as pb represents the price bucket; cat indicates the industry code that is derived from the category translation; dur is the length of the creative in seconds. For example, a generated key value of hb_pb_cat_dur=1100_398_30s would indicate: a price bucket of $11.00 (or the local currency); the industry represented by id 398; and a duration of 30 seconds. These key values are returned at 204A to the SSAI server 220 such as part of the video response, for example via an OpenRTB response.

In one or more embodiments, other dimensions can be included in the key value pairs in order to provide more control and flexibility for bidders and/or publishers. For example, one or more additional dimensions in the key value pairs provided by the prebid server 225 to the SSAI server 220 could be requirements of the bidder (e.g., bidder only wants its creative to be in a mid-roll) which are to be enforced by the ad server 240. In one embodiment, these bidder requirements are included in the bid responses and the prebid server 225 generates key value pairs representative of the bidder requirements. As an example, a bidder may require that its creative appears in a mid-roll of the video stream and not in the pre-roll or the post-roll. This bidder requirement would be placed in the bid response and then the prebid server 225 would generate a key value pair accordingly. Various bidder requirements can be utilized such as a position in the ad pod; a selection of the ad pod from among a pre-roll, a mid-roll or a post-roll of the video stream; another brand or another category for another creative that must also be in the ad pod; another brand or another category for another creative that must not be in the ad pod; or any combination thereof. In one or more embodiments, the bidder requirement can identify a specific brand; a classification of a brand related to content included in the creative; a rating for brand safety to limit offensive content in the creative (e.g., ratings according to government regulations); a content class for content in the creative (e.g., particular type of speech (hate, political, and so forth), sexual or graphic content, gambling, violence, alcohol in the creative); an advertising content classification; ad ratings (e.g., age appropriate characterization); and/or classification exclusions requirements (e.g., creatives for a first product such as food which are not to be shown in same ad pod with creatives of a second product such as pest control). In one or more embodiments, a brand identification, a content classification for the creative, a content creative rating (e.g., ratings according to government regulations), an advertising content classification, an ad rating, and/or other descriptive information corresponding to the brand or corresponding to content included in the creative for the brand can be provided in key value pairs (e.g., obtained from bid responses) so that a brand safety policy or other business rule can be applied in the determination of winning bids, such as: to prevent a particular brand from being included in an ad pod of offensive or undesired content; to prevent a particular brand from being included in an ad pod with an offensive or undesired other brands; and/or to prevent content from being exposed to or associated with offensive or undesired brands.

In one embodiment, brand safety can be enforced via a bidder requirement preventing a creative from appearing in undesired content or in an ad pod with undesired creative(s)). Brand safety limitations can be implemented via business rules to be applied to protect brands from being exposed to or associated with offensive or undesired content and/or exposed to or associated with offensive or undesired other brands. Brand safety limitations can be implemented via business rules to be applied to protect content from being exposed to or associated with offensive or undesired brands. In another embodiment, genre selection can be enabled, such as via a bid requirement. In one or more embodiments, audience targeting and/or contextual (content) targeting can be implemented to provide buyers with more desirable ad space which can improve monetization. For example, information identifying audience targeting parameters (e.g., audience demographics) and/or contextual targeting parameters (identification of genre or Title) can be passed in the bid requests.

In one embodiment, the number of dimensions for the key value pairs (derived from the bid responses) can be designated by the publisher and/or the bidder. In another embodiment, the dimensions utilized in the key value pairs can be synchronized with or otherwise compatible with the line items utilized by the ad server 240.

In another embodiment, the bidder response can provide information to control frequency capping, such as a cap limit (e.g., per long form video, per hour, per day, etc). This information can be provided to and enforced by the ad server 240 through key value pairs generated by the prebid server 225. In one embodiment, the frequency capping can be performed as cross-device frequency capping such as limiting brand overexposure to a user or a household such as where more than one device is utilizing OTT services. In one or more embodiments, a publisher can pass in or provide identification information (e.g., an Identifier For Advertising (IFA)) associated with users, devices and/or premises rendering the particular content and creatives to allow for cross-device frequency capping. As an example, this information can be provided to various devices including the SSAI server, the ad server, the prebid server, the prebid script being executed by the end user device, and so forth. In one embodiment, the ad server can perform the frequency capping, which may or may not be based on key value pairs and/or bid responses.

In embodiments where additional dimensions (e.g., in addition to or in place of one or more of price, category and duration) are utilized in the key value pairs, the ad server 240 can be configured (e.g., via an ad server interface for configuring line items or other objects) for reading and recognizing these additional dimensions. In another embodiment, additional requirements could be included in the bid response metadata and the prebid server 225 could filter out bids to obtain the appropriate bids. In one embodiment, requirements of the publisher (e.g., publisher is only seeking bids for a mid-roll) could be processed via a bid filtering performed by the prebid server 225. In one embodiment, the bid responses (or a portion thereof) can include only brand information or a combination of category and brand information, and the prebid server 225 can return to the SSAI server 220: category and brand information; only category information; or only brand information. In one embodiment, the brand information included in the bid response can be utilized by the prebid server 225 to determine the category which can then be translated to a category recognizable by the particular ad server 240 which is included in the returned key value pairs.

The SSAI server 220 can parse the returned key value pairs and at 205A provide them to the ad server 240. For example, the key value pairs can be appended as a query string to the ad server request URL and submitted as an ad call request. However, other techniques and protocols can be utilized for delivering key value information to the ad server 240. In one embodiment, the SSAI server 220 can take the key values from the response: adPods.[ ].targeting.[ ]${key} and pass them to the ad server 240 as keywords.

At 206A, the ad server 240 returns information representative of the optimized or otherwise determined ad pod. For example, a SmartXML response can be returned to the SSAI server 220. Although, other techniques and protocols can be utilized for delivering the determined ad play list for the ad pod to the SSAI server 220. As part of this process, the ad server 240 determines which creatives are to be provided in the ad pod according to the application of business rules. This process can include the ad server 240 comparing the key value pairs to line items in order to find a matching line item, as well as comparing to other line items that bid on the impression and can include determining winning bids from among prebidders, direct bidders and guaranteed buys according to the business rules. In one or more embodiments, the ad server 240 can target any bid where the bid duration matches that of the line item.

The providing of the key value information by the SSAI server 220 to the ad server 240 enables the ad server to determine the ad play list for the ad pod of the video stream according to the business rules. As an example, the business rules can include a yield policy that is enforced based on the price (e.g., highest price) for each of the candidate bid responses. The yield policy can be based on increasing or maximizing revenue from advertising for a publisher of the video stream. The business rules can include a competitive separation policy that is enforced based on the category for each of the candidate bid responses. For example, the ad server 240 can prevent creatives from a same industry (e.g., a same category) appearing in a same ad pod or appearing next to each other in the ad pod. In one embodiment, application of the yield policy can result in a bid being selected which may not be the highest bid but results in a higher yield for the particular ad pod of for the particular video content. As an example, a lower price creative may be selected over a higher price creative for an ad pod because the lower price creative does not prevent other higher price creatives from being included in the ad pod (e.g., according to the competitive separation policy, a brand safety policy, or a bidder requirement) and results in this example in an overall higher overall yield. In another example, a lower price creative may be selected over a higher price creative for an ad pod based on frequency capping rules because the lower price creative can appear more often in the long form video and results in this example in an overall higher yield than selecting the higher price creative which may be limited to being presented one time. In this example, the frequency capping can be enforced based on line item data and/or key value information derived from the bid responses.

The business rules being applied to the key value pairs and line items by the ad server 240 can enable achieving other goals as well. As an example, the business rules could allow the bidder more choice such as through use of key value pairs derived from the bid responses that represent: a position in the ad pod; a selection of the ad pod from among a pre-roll, a mid-roll or a post-roll of the video stream; another brand or another category for another creative that must also be in the ad pod; another brand or another category for another creative that must not be in the ad pod; or a combination thereof.

In one embodiment, competitor separation can be enforced according to brand names rather than, or in combination with, categories. For instance, the key value pairs can include a first creative for soda brand X from a first bid, a second creative for soda brand Y from a second bid, and a third creative for water brand Z from a third bid. Based on brand competitor separation rather than category separation, it may be permissible for the creatives for soda brand X and water brand Z to be in a same ad pod while the creative for soda brand Y is either not determined to be a winning bid by the ad server 240 or is placed in a different ad pod.

In one embodiment at 207A, the SSAI server 220 can request and obtain creatives from some or all of the prebid cache 235. For example, the creatives from the prebid cache 235 for any winning prebids can be retrieved from the prebid cache 235 which are to be stitched into the ad pod of the content delivered to the end user device. In one embodiment, the ad server 240 can provide the creatives for any non-prebid winners (e.g., direct bid winners or guaranteed buys) to the SSAI server 220. In this example, the ad pod can include prebid winner creatives and non-prebid creatives which can be obtained from different sources.

The SSAI server 220 can request the content (e.g., movie, episode of a show, other long form video) from a content host or provider or other content source 245 and can stitch the creatives and content together. At 208A, the stitched video stream can be returned to the video player 215 of the end user device for rendering the OTT service.

System 200 can increase or optimize effective cost per mille (eCPM). Using a prebid-architecture enables publishers to increase or maximize CPMs by allowing bidders to compete for the publisher's audience (which can optionally compete against direct sold creatives). System 200 provides competitive separation through ad server labels or categories that are translated, such as from standard IAB sub-categories, and which enables brand compliance and control similar to what is seen in other media services, such as television service.

In one or more embodiments, a VAST Extensible Markup Language (XML) is cached (e.g., in a prebid cache) such as to account for video players that only work with a URL that returns VAST XML, not VAST directly. In some embodiments, the VAST XML can be cached on the server-side and/or a prebid script can perform the caching. For example, the bid responses can include a bid.videoCacheKey, a bid.vastXml, a bid.vastUrl or any combination thereof. In one embodiment, the VAST XML for winning bids, a portion of all of the bids, or all of the bids can be stored in the prebid cache without storing the actual video ad. In one or more embodiments, system 200 enables control over how frequently a placement will appear within a campaign, which can include various frequencies such as allowing a repeat in a commercial break, not allowing a repeat, or a default setting.

In one or more embodiments, system 200 provides for exclusivity by preventing ads from a same industry group or other categorization from appearing either in the same ad pod or adjacent to each other in the same ad pod. In one embodiment, a level of exclusivity can be provided or configured to determine the range of ads that fall within the competitive separation rules. The level can be of various types including no exclusivity, no other industry ad appearing in the same ad pod, a custom exclusivity configuration, and so forth. In one embodiment, a scope of exclusivity can be provided or configured to determine on what ad types the competitive separation will occur. The scope can be of various types including any ad, targeted ads, ads appearing adjacent to the creatives, and so forth.

In one or more embodiments, an interface is provided to enter an identifier for a line item and line item data which can control when an ad will display and for how long, at the CPM or other pricing model, the size of the creative, and so forth. The interface can enable inputting accompanying creatives and additional targeting to be specified. The interface can provide for inputting labels such as industry identifiers that enable preventing ads in the same industry group from appearing either within or adjacent to each other in the ad pod. In one embodiment, labels entered in a line item are only applied to that line item. In one or more embodiments, the interface is accessible (e.g., by a publisher) for configuring the ad server 240 or line items used by the ad server In one embodiment, a maximum duration of the video creative can be entered into the interface. This value can be used for forecasting purposes. In one embodiment, information regarding the campaign, including start and end times, the desired rate, currency, revenue type, and so forth can be entered via the interface. In one embodiment, other information can be entered such as quantity (e.g., number of impressions, clicks or viewable impressions); rate (e.g., amount for either CPM or CPA); and/or discount (e.g., amount the line item cost will be reduced which may not affect a priority of the line item).

In one embodiment, targeting information can be entered via the interface which enables setting values to focus the targeting of the publisher's ad space to certain types of ads or audiences. In one embodiment, video position can be entered via the interface which enables the placement of the creative within the video, such as pre-roll for the beginning of a video or post-roll for the end. In one embodiment, inventory information can be entered via the interface which enables selecting which inventory to include. In one embodiment, key-values and/or audience information can be entered via the interface which enables the selection of an audience segment and age to target for the ad unit and/or allows for the inclusion of custom keywords. As an example, a key word hb_pb_cat_dur which stands for RATE_LABEL_DURATION where: RATE: the currency amount entered in the rate field; LABEL: the value of the label field in the line item; DURATION: the length of the video in seconds. In one embodiment, geography information can be entered via the interface which enables specifying a geographic location where the creative will display. In one embodiment, device information can be entered via the interface which enables specifying settings for targeting browser, browser language, device, and operating system. In one embodiment, connection information can be entered via the interface which enables specifying settings for targeting bandwidth, mobile carriers and domains.

In one or more embodiments, line items can have an inventory size selection which dictates whether creatives are attached or not, such as standard or master/roadblock selections having creatives attached directly to them, while video VAST selections do not have creatives. For example, video VAST selections can have creative sets associated with them where each creative set contains a URL that points to cached VAST XML.

Figure 2B:
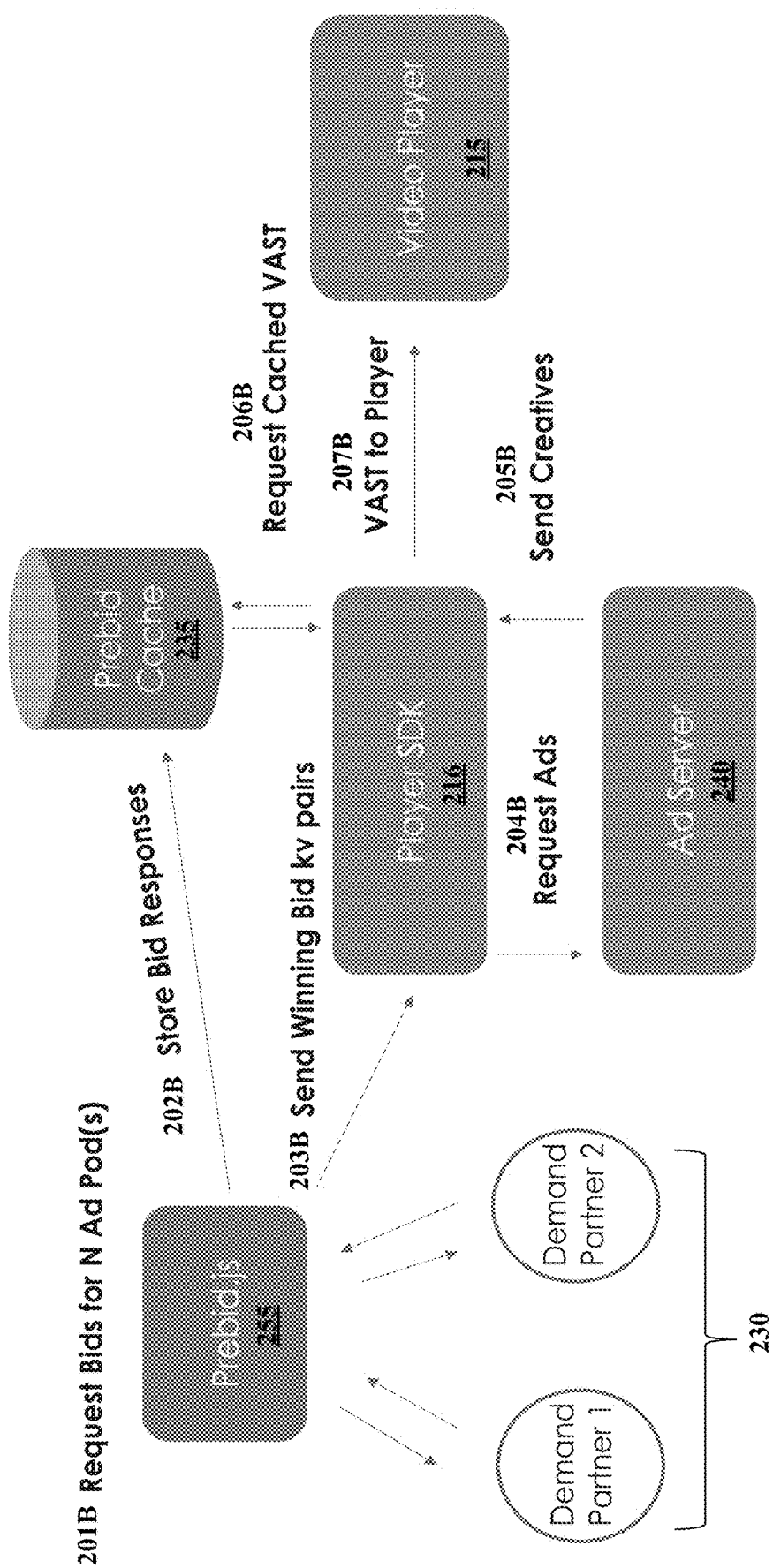
FIG. 2B is a block diagram illustrating an example, non-limiting embodiment of a system functioning within or in conjunction with the communication network of FIG. 1 in accordance with various aspects described herein.

FIG. 2B is a block diagram illustrating an example, non-limiting embodiment of a system 250 that manages advertising including providing prebidding for various types of media services such as OTT video (e.g., video that includes ad pods, long form video, episodes of shows, movies, etc.). System 250 can perform a CSAI implementation using prebid code or script 255 (e.g. a javascript). System 250 can function in, or in conjunction with, various communication systems and networks including the communications network 100 of FIG. 1 in accordance with various aspects described herein.

At 201B, the prebid script 255 can conduct or otherwise perform the prebid auctions for obtaining bids and determining candidate bids. For example, the prebid script 255 can send requests for bids to selected demand partners 230 (e.g., competing SSPs/ad exchanges). The demand partners or SSPs 230 can return bid responses to the prebid script 255. As an example, each bid response can include the bid price and a video creative (e.g., in the form of a VAST tag URL which returns a VAST XML wrapper). For instance, if the bid is selected by the ad server 240 then this video creative can be rendered by the video player 215. To enable competitive separation, each bid response can return a creative category, such as an IAB subcategory. In one embodiment, the prebid script 255 can translate between ad server categories and IAB sub categories. In another embodiment, a publisher can utilize its own mapping file, such as by setting a URL location of that file.

In one embodiment at 202B, each video bid (or candidate bids) can be stored in the prebid cache 235 where mapping IDs are generated and provided to the ad server 240. Candidate bids can then be selected by the prebid script 255 from among the received bids, such as the highest bids overall or the highest bid(s) from each category. The process of determining the candidate bids can be controlled by the publisher such as: selecting the highest bids regardless of category; or selecting the highest bids and excluding duplicate bids from the same category; or selecting a plurality of highest bids from each category, and so forth.

At 203B, the prebid script 255 can send (e.g., via the player SDK 216) key value pairs associated with the candidate bids. For example, the prebid script 255 can generate a master video ad server tag URL from an existing video ad server tag and from identified key value targeting pairs based on information included in the bid responses (e.g., price, category, duration). At 204B, the player SDK 216 can send an ad request to the ad server 240. For instance, the player SDK 216 can load the master video ad server tag URL, which causes a call to the ad server 240.

The ad server 240 can then apply business rules including a revenue yield policy and a competitive separation policy to determine winning bids from among the prebids which can be considered alone or can be considered in conjunction with direct bids and/or guaranteed buys that are managed by the ad server 240. The application of the business rules can be done through matching of key value pairs with pre-configured line items. At 205B, creatives included in the determined ad play list (e.g., for the ad pod) can be sent to the player SDK 216, such as for creatives that are not prebidder creatives but rather direct bids or guaranteed buys. At 206B, a request for cached VASTs can be made (e.g., for each of the prebid creatives that are included in the ad pod).

In one embodiment, the master video ad server tag URL can be utilized for returning VAST XML wrappers containing the creatives or a portion thereof for the ad pod. At 207B, the creatives can be rendered in the ad pod, such as the VAST tag URL being rendered by the video player 215.

Figure 2C:
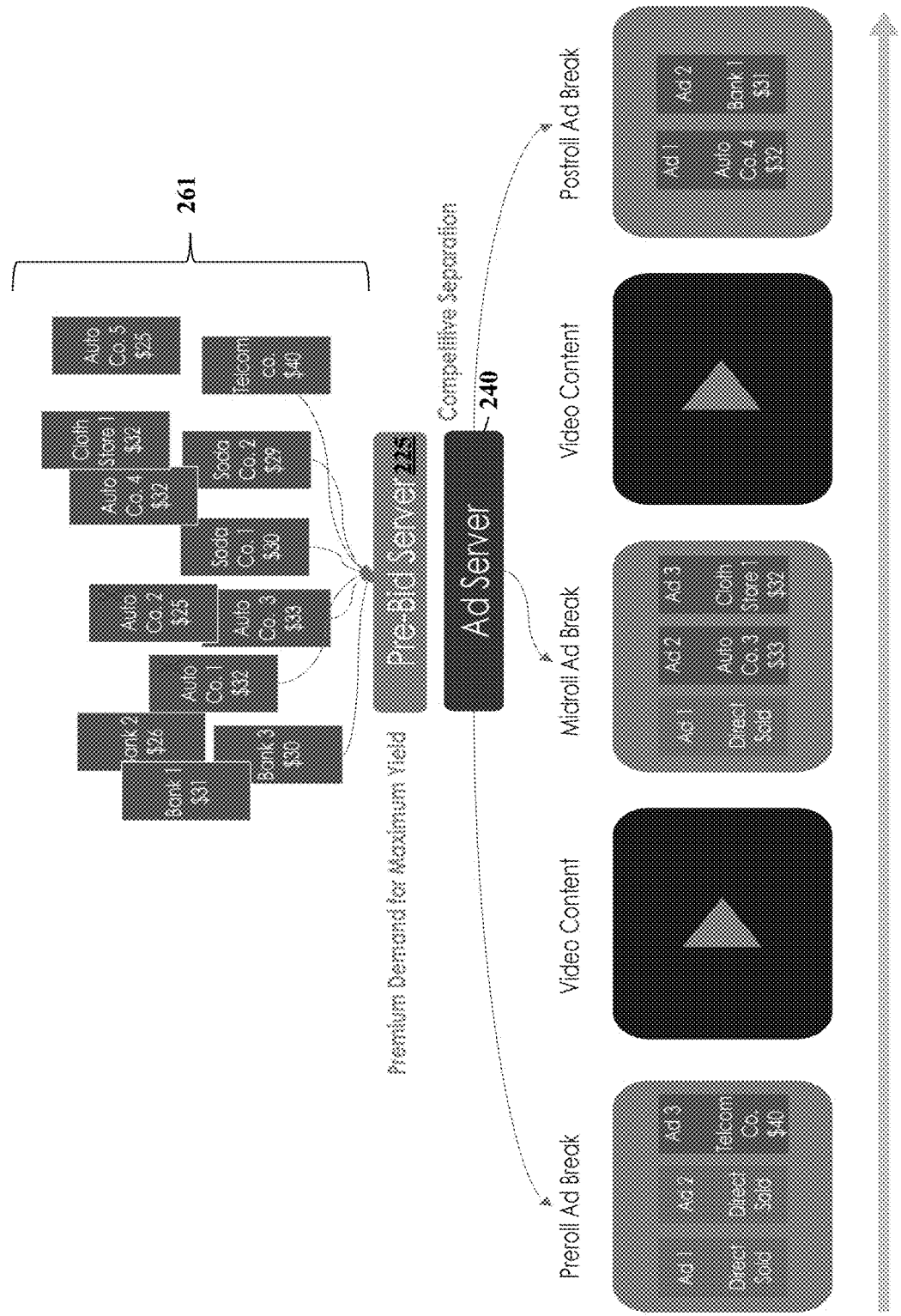
FIG. 2C is a block diagram illustrating an example, non-limiting embodiment of a data flow occurring within or in conjunction with the communication network of FIG. 1 in accordance with various aspects described herein.

FIG. 2C is a block diagram illustrating an example, non-limiting embodiment of data flow 260 associated with advertising insertion for OTT long form video. Data flow 260 can result from the exemplary embodiments described herein including systems 100 and 200. The data flow 260 illustrates competitive separation and yield optimization being applied in long form video such as an OTT service. The prebids 261 can be provided to the prebid server 225 and then candidate bids can be provided to the ad server 240 through use of key value pairs. In this example, three ad pods (pre-roll, mid-roll and post-roll) are to be populated in the OTT video. Candidate bids can be selected by the prebid server 225 for each category (e.g., three of five bids are selected for the auto category). The ad server 240 can then apply various business rules including competitive separation and revenue yield optimization in determining the ad play list. As can be seen, the pre-roll and mid-roll include a combination of direct buys with prebids, while the post-roll is only prebids. Competitor ads are not placed together in an ad pod. The competitive separation can be applied to both the prebids and the non-prebids (e.g., direct offers and guaranteed buys). The exemplary embodiments provide for flexibility in the ad pod configuration including ad pods that are all prebid, a mixture, or all direct creatives. The ad pods can have various numbers of ad slots of various durations, such as 3-10 ad slots which can be a same or different durations.

The exemplary embodiments, provide for flexibility in configuring the ad pods based on number of slots, duration per slot, and duration per pod which can further improve the efficiency in applying the revenue yield policy, as well as meeting the requirements of the bidders. For example, a first slot may be preferred over a second slot in an ad pod and a bidder may be willing to pay more for the first slot. In one example, the bidder can specify the first bid as a bidder requirement which gets passed to the ad server as a key value pair. The ad pod configuration can provide flexibility to either or both the buyer and the publisher, such as allowing a publisher to seek creatives of different durations which can fill different positions in an ad slot without needing to specify to the bidder the particular ad slot position.

Figure 2D:
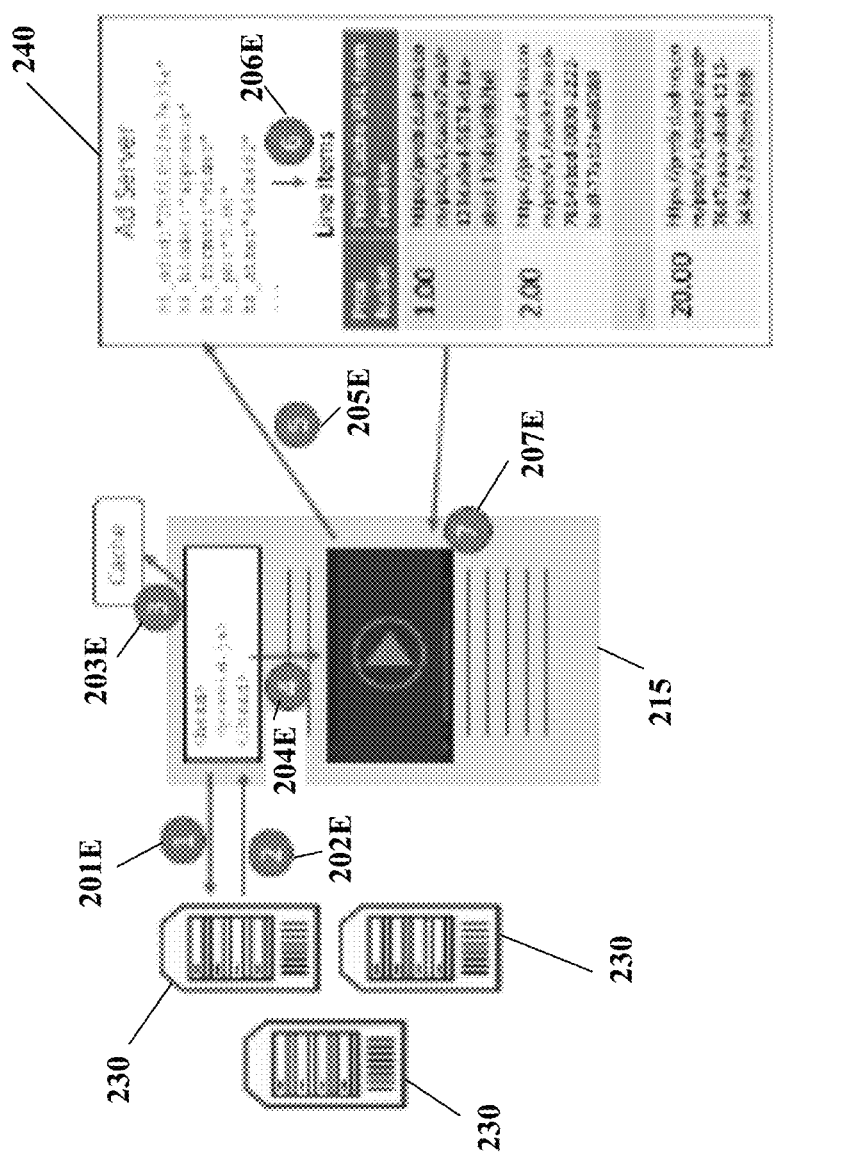
FIG. 2D is a block diagram illustrating an example, non-limiting embodiment of a system functioning within or in conjunction with the communication network of FIG. 1 in accordance with various aspects described herein.

FIG. 2D is a block diagram illustrating an example, non-limiting embodiment of a system 265 that manages advertising insertion for OTT long form video. System 265 can function in, or in conjunction with, various communication systems and networks including the communications system 100 of FIG. 1 in accordance with various aspects described herein. Long-form video content can have a content arc with a beginning, middle and end. Video creatives can be displayed in an ad pod, which is a grouping of individual ads that appear either in the beginning, end or during the video content.

At 201E, the prebid code can load within the page header and can send a bid request to each video demand partner 230 that is included on a given prebid video ad unit. At 202E, the demand partners 230 can respond such that each bid response includes: a bid price, a video creative in the form of a VAST tag URL which returns a VAST XML wrapper; and an IAB subcategory. Other information can also be included in the ad responses such as positioning in the ad pod or positioning in the video stream. A category translation can be performed by a module to convert between ad server categories and IAB sub categories (a mapping file can also be used that is supplied by the publisher such as via a URL).

At 203E, each video bid can be cached server-side (e.g., in a prebid database) and mapped to a unique cache ID which can be passed to the ad server 240 via key value targeting. In one embodiment, the ad server 240 can be configured to contain a macro that references this cache ID. In one or more embodiments, bidders can cache video creatives before responding to the prebid request. At 204E, the prebid code can create a new master video ad server tag URL, such as by combining an existing video ad server tag with key value targeting pairs derived from the bid responses. This URL can be passed into the video player. At 205E, the video player can call the ad server 240 by loading the master video ad server tag URL, which makes a call to the ad server. At 206E, the ad server 240 can match key value pairs obtained from the URL to a pre-configured line item. At 207E, the video player can render the video creative from a winning bidder. For example, the master video ad server tag URL can return a VAST XML wrapper containing a prebid video creative. The prebid video creative can return a VAST XML document containing the cached video bid, which was returned by the demand partner in its bid response. The demand partner's VAST tag URL can then be rendered in the video player.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, 265, data flow 260, and methods 700, 800, 900 presented in FIGS. 1, 2A, 2B, 2C, 2D, and 3. For example, virtualized communication network 300 can facilitate in whole or in part providing ad insertion in OTT media services including long form video where revenue yield and competitive separation policies are enforced by the ad server according to key value pairs provided by a prebid server and/or a client-side prebid code and where the prebid auctions enable competition between prebids from multiple SSP servers, direct offers or guaranteed buys. The key value pairs can include a category of the creative to facilitate the competitive separation enforcement and/or one or more bidder requirements to provide the bidder with more control over ad placement.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
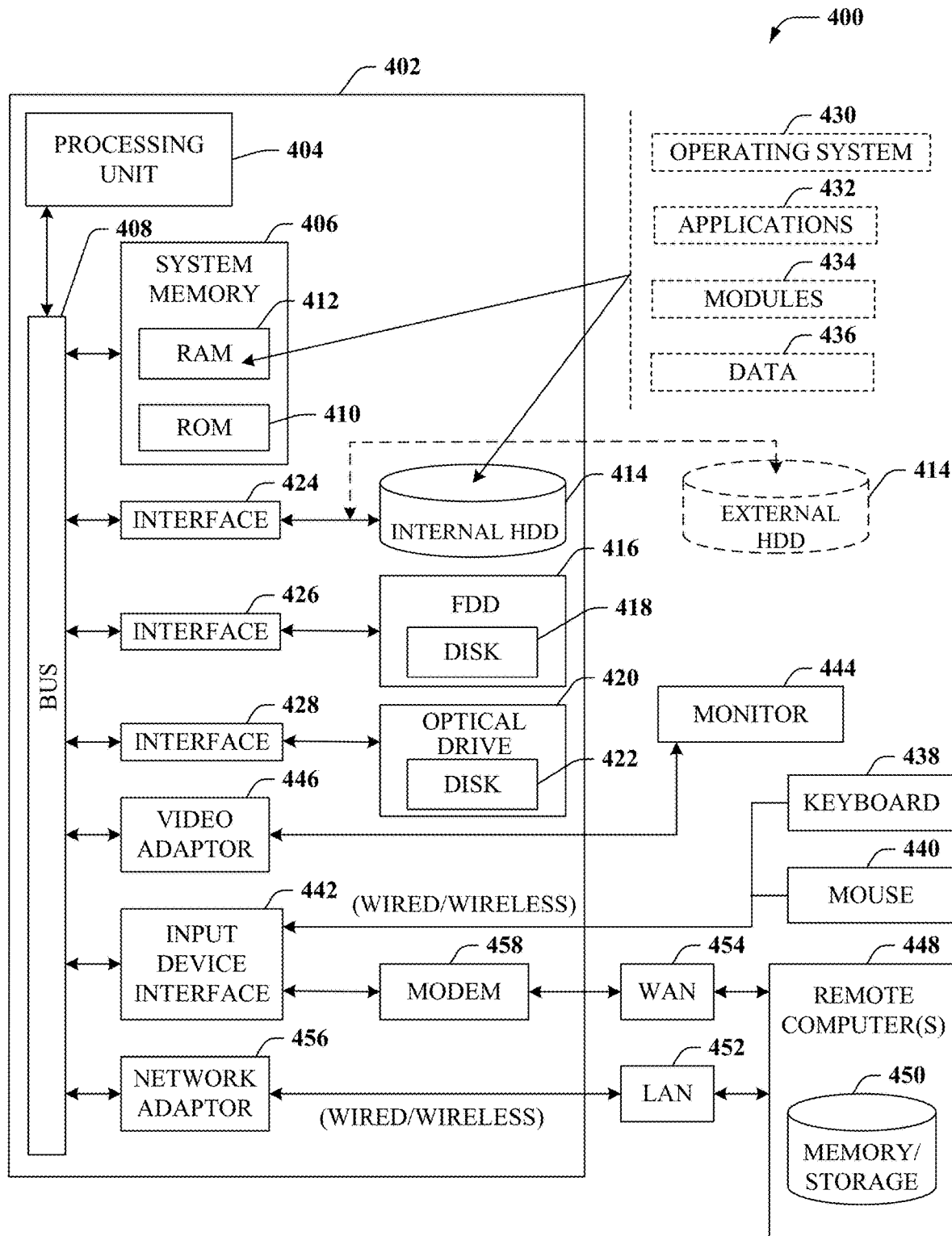
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part providing ad insertion in OTT media services including long form video where revenue yield and competitive separation policies are enforced by the ad server according to key value pairs provided by a prebid server and/or a client-side prebid code and where the prebid auctions enable competition between prebids from multiple SSP servers, direct offers or guaranteed buys. The key value pairs can include a category of the creative to facilitate the competitive separation enforcement and/or one or more bidder requirements to provide the bidder with more control over ad placement.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
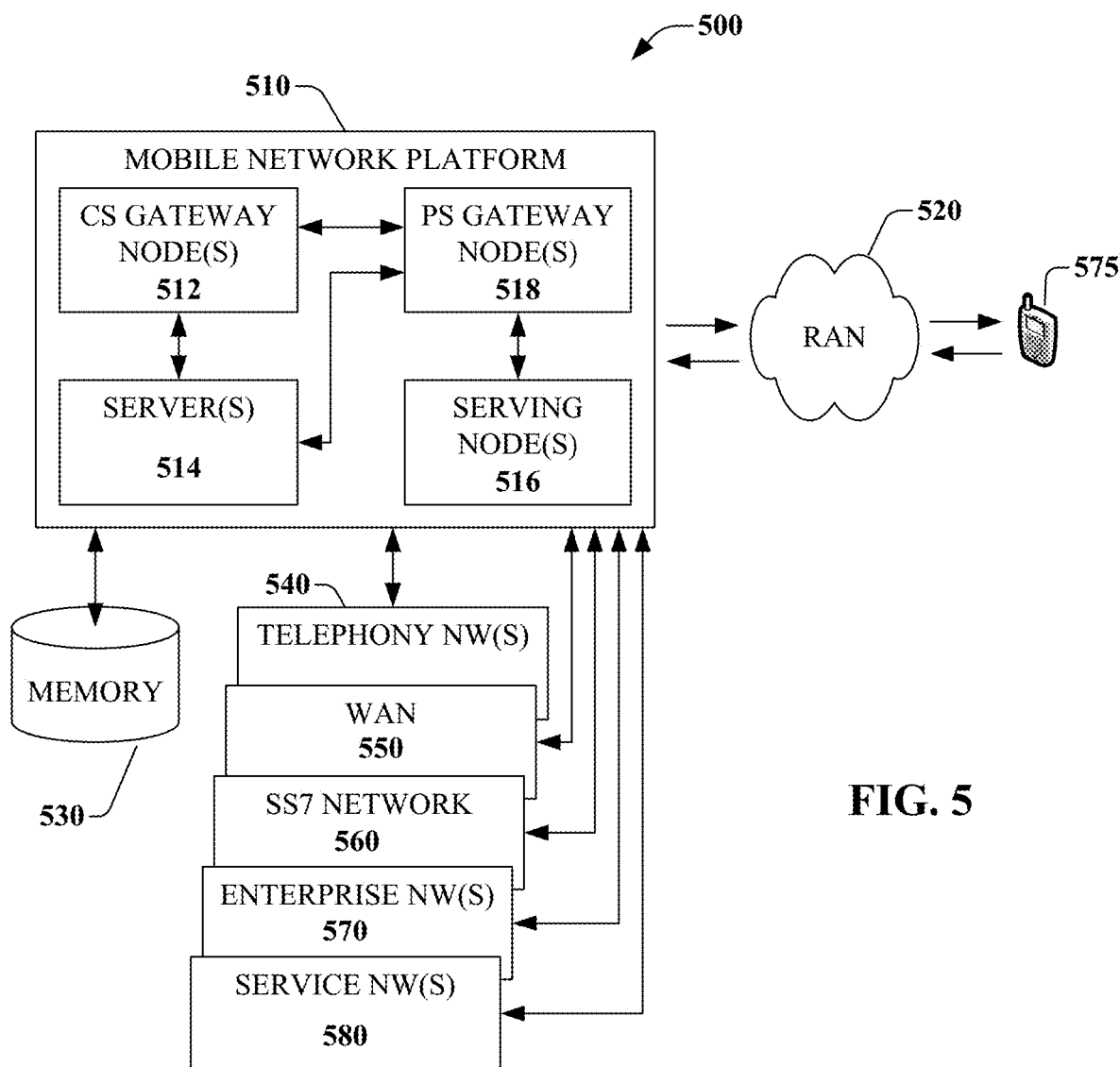
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part providing ad insertion in OTT media services including long form video where revenue yield and competitive separation policies are enforced by the ad server according to key value pairs provided by a prebid server and/or a client-side prebid code and where the prebid auctions enable competition between prebids from multiple SSP servers, direct offers or guaranteed buys. The key value pairs can include a category of the creative to facilitate the competitive separation enforcement and/or one or more bidder requirements to provide the bidder with more control over ad placement.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network(s) 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
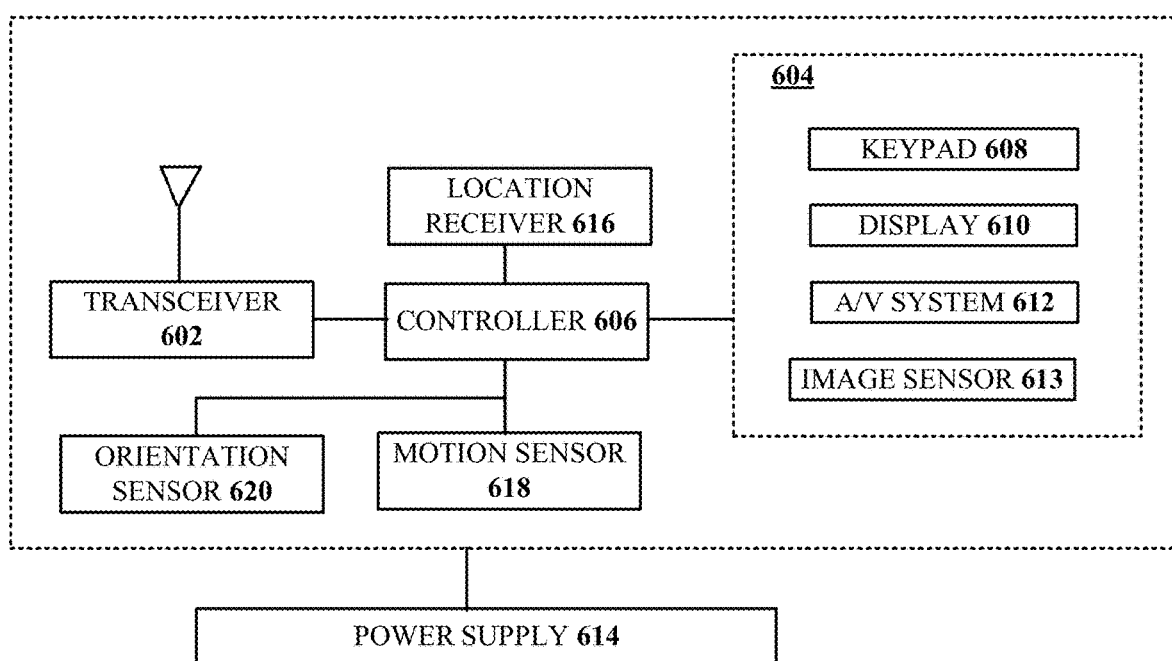
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part providing ad insertion in OTT media services including long form video where revenue yield and competitive separation policies are enforced by the ad server according to key value pairs provided by a prebid server and/or a client-side prebid code and where the prebid auctions enable competition between prebids from multiple SSP servers, direct offers or guaranteed buys. The key value pairs can include a category of the creative to facilitate the competitive separation enforcement and/or one or more bidder requirements to provide the bidder with more control over ad placement.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

Figure 7:
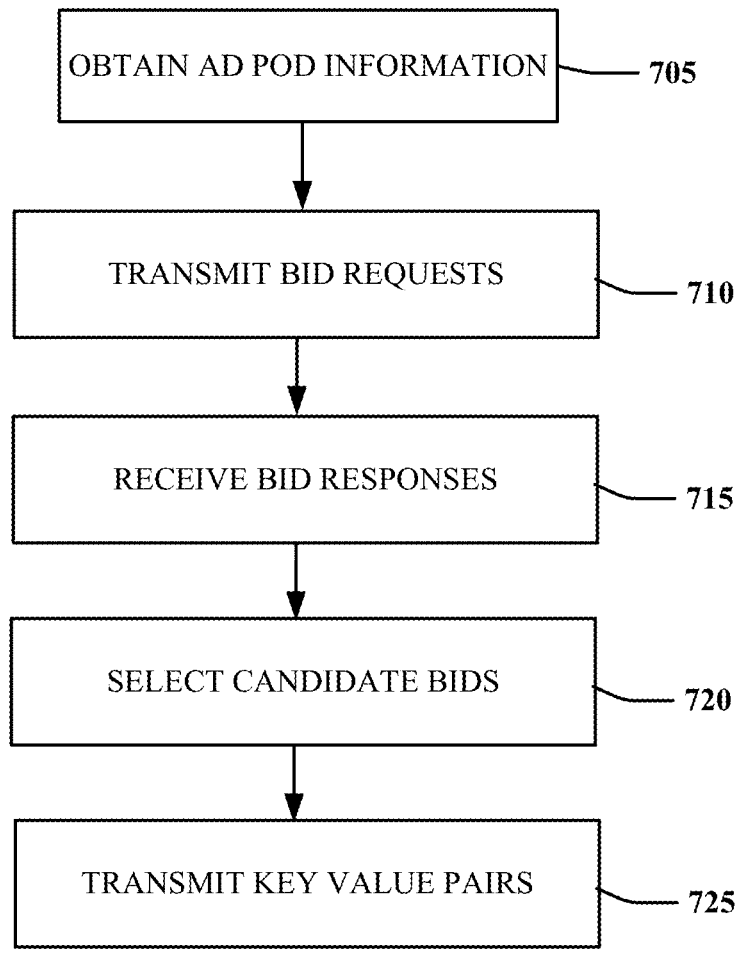
FIG. 7 depicts an illustrative embodiment of a method in accordance with various aspects described herein.

FIG. 7 depicts an illustrative embodiment of a method 700 in accordance with various aspects described herein. At 705, ad pod information can be provided over a network to the prebid server 225 from the SSAI server 220. The ad pod information can be associated with an ad pod of a video stream requested by a video player 215 of an end user device where the video stream is being requested as an OTT media service. At 710, bid requests can be transmitted by the prebid server 225 over the network to the plurality of SSP servers 230 to perform prebid auction(s) which can be simultaneous or overlapping in time. For instance, the bid requests can be based on the ad pod information. At 715, bid responses can be received by the prebid server 225 over the network within a time deadline. For example, the bid responses can be from one or more of the plurality of SSP servers 230. As another example, each of the bid responses can include a price, a category of a creative, and a duration of the creative. At 720, candidate bid responses can be selected by the prebid server from among the bid responses according to the price of each of the bid responses. At 725, key value pairs can be transmitted by the prebid server 225 over the network to the SSAI server 220, where the key value pairs are representative of the price, the category, and the duration for each of the candidate bid responses.

In one embodiment, the transmitting of the key value pairs enables the SSAI server 220 to provide key value information representative of the price, the category, and the duration for each of the candidate bid responses to the ad server 240. In one embodiment, providing the key value information to the ad server 240 enables the ad server to determine an ad play list for the ad pod of the video stream according to business rules. In one embodiment, the business rules include a yield policy that is enforced based on the price for each of the candidate bid responses, where the yield policy is based on increasing revenue for a publisher of the video stream. In one embodiment, the business rules include a competitive separation policy that is enforced based on the category for each of the candidate bid responses. In one embodiment, the SSAI server 220 stitches content of the video stream with creatives from the ad play list into the ad pod resulting in stitched content provided to the video player 215 of the end user device.

In one embodiment, the key value pairs include a bidder requirement, where the business rules include enforcing the bidder requirement to determine the ad play list for the ad pod of the video stream. In one embodiment, each of the bid responses includes the bidder requirement. In one embodiment, the bidder requirement is representative of a position in the ad pod. In one embodiment, the bidder requirement is representative of a selection of the ad pod from among a pre-roll, a mid-roll or a post-roll of the video stream. In one embodiment, the bidder requirement is representative of another brand or another category for another creative that must also be in the ad pod. In one embodiment, the bidder requirement is representative of another brand or another category for another creative that must not be in the ad pod. In one embodiment, the bidder requirement is representative of one, some or all of: a frequency capping limitation, a genre limitation, and/or a brand safety limitation. In one embodiment, the prebid server 225 translates the category for each of the candidate bid responses into translated categories that are recognizable by the ad server 240, where the key value information representative of the category for each of the candidate bid responses comprises the translated categories, and where the enforcing the competitive separation policy by the ad server is based on the translated categories.

In one embodiment, the prebid server 225 stores the candidate bid responses in a prebid cache as stored bids, where at least one of the creatives stitched into the ad pod is obtained by the SSAI server from the prebid cache. In one embodiment, the ad play list can be determined by the ad server 240 based on the yield policy and the competitive separation policy applied to one or more direct offers obtained by the ad server, where the one or more direct offers indicate the price, the category, and the duration for each of the one or more direct offers. In one embodiment, the prebid server 225 can receive, over the network, an incomplete bid response from one of the plurality of SSP servers 230, where the incomplete bid response includes the price and the duration, where the incomplete bid response does not include the category of the creative, and where the prebid server discards the incomplete bid response.

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
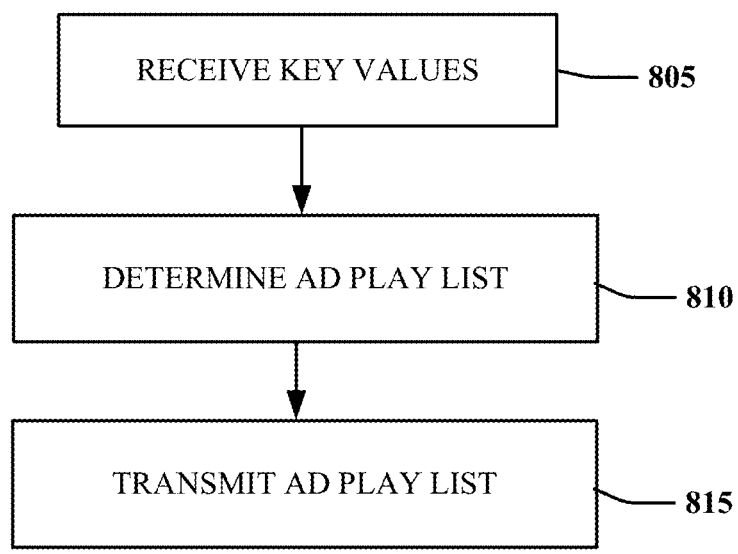
FIG. 8 depicts an illustrative embodiment of a method in accordance with various aspects described herein.

FIG. 8 depicts an illustrative embodiment of a method 800 in accordance with various aspects described herein. At 805, an ad server 240 receives, over a network from the SSAI server 220, key value information associated with candidate bid responses for an ad pod of a video stream requested by an end user device. The video stream can be requested as an OTT media service. The key value information can be representative of a price, a category of a creative, and a duration of the creative for each of the candidate bid responses. The candidate bid responses can be determined by the prebid server 225 from among bid responses received by the prebid server over the network within a time deadline during a prebid auction from a plurality of SSP servers 230 responsive to the SSAI server 220 providing ad pod information associated with the ad pod to the prebid server.

At 810, the ad server 240 can determine an ad play list for the ad pod of the video stream according to business rules. The ad server 240 can access the business rules which include a yield policy and a competitive separation policy. The yield policy can be enforced by the ad server 240 based on the price for each of the candidate bid responses, where the yield policy is based on increasing revenue for a publisher of the video stream. The competitive separation policy can be enforced by the ad server 240 based on the category for each of the candidate bid responses.

At 815, the ad server 240 can transmit, over the network to the SSAI server 220, ad play list information representative of the ad play list for the ad pod of the video stream. The transmitting of the ad play list information can enable the SSAI server 220 to stitch content (e.g., obtained from a content source) of the video stream with creatives from the ad play list into the ad pod resulting in stitched content that is provided to the end user device to be rendered. In one embodiment, the determining the ad play list can be based on the yield policy and the competitive separation policy being applied to one or more direct offers obtained by the ad server 240, where the one or more direct offers indicate the price, the category, and the duration for each of the one or more direct offers. In one embodiment, the category for each of the candidate bid responses can be translated by the prebid server 225 to be recognizable by the ad server 240.

In one embodiment, the key value information includes a bidder requirement, where the determining the ad play list is based on applying the business rules to enforce the bidder requirement. In one embodiment, the bidder requirement can be representative of a position in the ad pod, a selection of the ad pod from among a pre-roll, a mid-roll or a post-roll of the video stream, or a combination thereof. In one embodiment, the bidder requirement can be representative of another brand or another category for another creative that must also be in the ad pod or that must not be in the ad pod. In one embodiment, the determining the ad play list by the ad server 240 can be based on the ad server selecting an ad pod configuration which comprises a selection of a position in the ad pod, a selection of the ad pod from among a pre-roll, a mid-roll or a post-roll of the video stream, or a combination thereof, and where the selecting the ad pod configuration by the ad server is based on applying the yield policy and the competitive separation policy. In one embodiment, the bidder requirement is representative of one, some or all of: a frequency capping limitation, a genre limitation, and/or a brand safety limitation.

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 9:
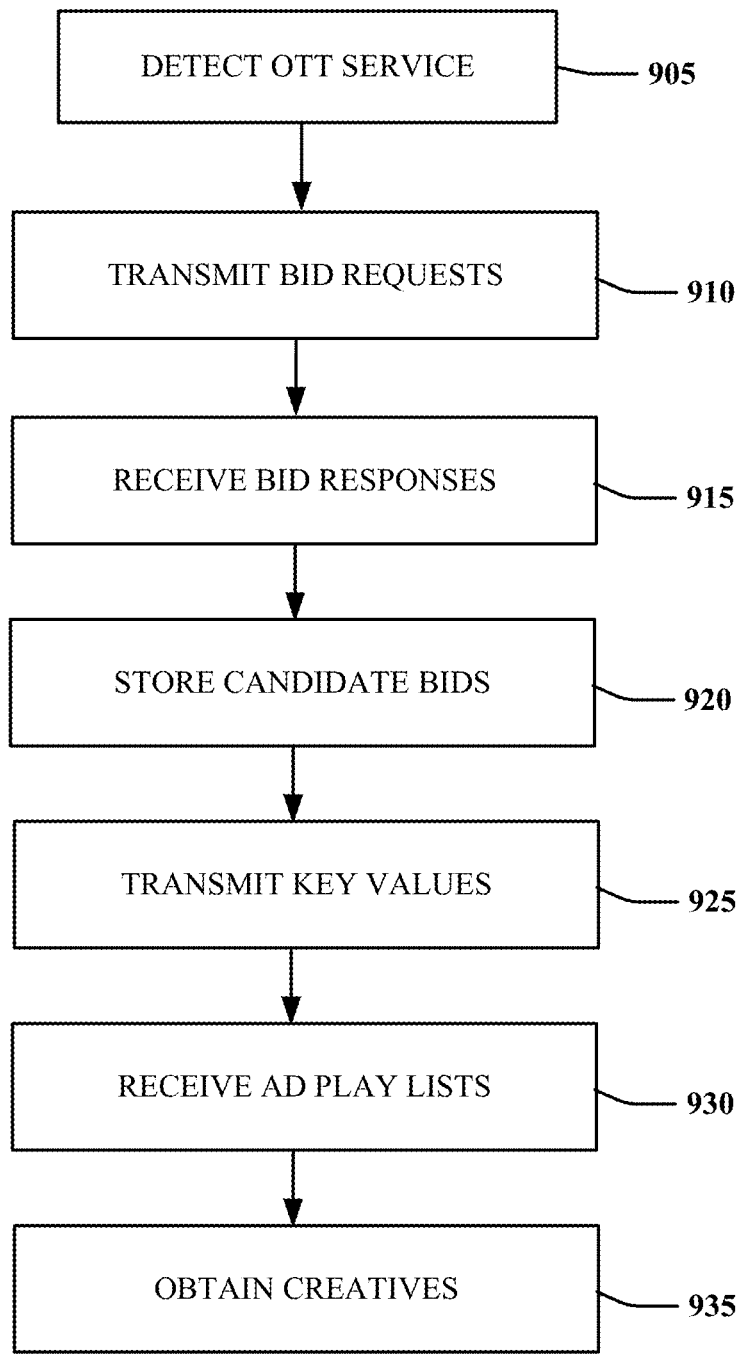
FIG. 9 depicts an illustrative embodiment of a method in accordance with various aspects described herein.

FIG. 9 depicts an illustrative embodiment of a method 900 in accordance with various aspects described herein. At 905, a video stream can be requested by an end user device as an OTT media service. At 910, bid requests can be transmitted, by the prebid script 255 of the end user device over a network, to a plurality of SSP servers 230. At 915, candidate bid responses can be received, by the prebid script 255 over the network within a time deadline during prebid auctions, from one or more of the plurality of SSP servers 230, where each of the candidate bid responses identify a creative and include a price and a category of the creative. At 920, the candidate bid responses can be stored by the prebid script 255 in a prebid cache server 235, where the candidate bid responses are mapped to corresponding unique cache identifications.

At 925, key value pairs can be transmitted from the prebid script 255 to the ad server 240. For example, an ad server tag URL can be generated by the prebid script 255 based on combining an existing video ad server tag with key value pairs obtained from the candidate bid responses, where the key value pairs are representative of the price and duration of each of the candidate bid responses. The ad server tag URL can then be utilized for transmitting over the network to the ad server 240, a request for an ad play list to populate an ad pod of the video stream. The transmitting of the request can enable the ad server 240 to determine the ad play list according to pre-configured line items and business rules including a yield policy and a competitive separation policy, which can be applied to prebids, direct bids and guaranteed buys. The yield policy can be enforced by the ad server 240 based on the price for each of the candidate bid responses, where the yield policy is based on increasing revenue for a publisher of the video stream. The competitive separation policy can be enforced by the ad server 240 based on the category for each of the candidate bid responses.

A 930, the end user device can receive, over the network from the ad server 240, ad play list information representative of the ad play list. At 935, creatives are obtained for the ad pod based on ad play list determined by the ad server 240. For example, one, some or all of the creatives identified in the ad play list can be obtained by the end user device from the prebid cache server 235 based on a unique cache identification. One, some or all of the creatives identified in the ad play list can be obtained by the end user device from the ad server 240. The creatives identified in the ad play list are then rendered in the ad pod by the video player 215 of the end user device.

In one embodiment, the prebid script 255 can receive, over the network within the time deadline during prebid auctions, a plurality of bid responses from the one or more of the plurality of SSP servers 230, where the plurality of bid responses includes the bid responses, and where each of the plurality of bid responses identifies the creative and includes the price and the category of the creative (and/or the duration of the creative). In one embodiment, the prebid script 255 can select candidate bid responses from among the plurality of bid responses according to the price of each of the plurality of bid responses. In one embodiment, the identifying the creative in each of the bid responses comprises providing a VAST tag URL that returns a VAST XML wrapper. In one embodiment, the key value pairs include a bidder requirement, where determining the ad play list by the ad server 240 is based on applying the business rules to enforce the bidder requirement, and where the bidder requirement is representative of one, some or all of: a position in the ad pod, a selection of the ad pod from among a pre-roll, a mid-roll or a post roll of the video stream, another brand or another category for another creative that must also be in the ad pod or that must not be in the ad pod, a frequency capping limitation, a genre limitation, a brand safety limitation, or a combination thereof.

While for purposes of simplicity of explanation, the respective processes are shown and described as a series of blocks in FIG. 9, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one or more embodiments, publishers can allocate portions of their ad space inventory to buyers (e.g., advertisers or ad networks) for the buyers' ad campaigns ("direct" ad campaigns or "programmatic" ad campaigns) through offline agreements. The terms of such agreements can include the payment model and pricing for the ad space inventory, the desired pacing of the ad campaign (e.g., the time rate at which the publisher's ad spaces are allocated to the ad campaign), targeting parameters (e.g., preferences or limits on which instances of ad space inventory can be allocated to an ad campaign, based on data associated with the ad space inventory), priority of the ad campaign relative to cotemporaneous ad campaigns on the publisher's site, and so forth.

In one or more embodiments, the agreements can be implemented and enforced by an allocation management module associated with (e.g., executing on) the publisher's ad server. To implement and enforce the terms of such agreements, the allocation management module can use line items and business/prioritization rules. For example, when a request to fill an available ad space is received, the allocation management module can compare characteristics of the ad space to the parameters of line items representing the publisher's agreements with buyers. If more than one line item matches the ad request (indicating that more than one creative or ad campaign may be eligible to fill the ad space), the allocation management module applies the business/prioritization rules including revenue yield policy and competitive separation policy to determine which ad campaign or creative fills the ad space which can be multiple ad spaces in an ad pod of OTT content being delivered to an end user device.

In one or more embodiments, line items facilitate allocating ad space inventory among buyers in ways that are consistent with the terms of agreements between a seller and the buyers, including targeting, pacing, prioritization, number of impressions, and budget constraints. In one or more embodiments, values of parameters of line items can be set (e.g., via input or by programmers) prior to initiating the ad campaign, although adjustments during the ad campaign could also be made.

In one or more embodiments, prebidding and/or direct bidding can be enabled for real-time bidders via server-side and/or client-side auctions. The prebidding and/or direct bidding can be performed on some or all of the ad inventory being sold, including some or all of the ad pods of OTT content. The direct bidding can be performed by an auction managed by an ad exchange associated with the publisher. The prebid auction can be managed by a prebid server (SSAI) or prebid script of the client device (CSAI) using simultaneous or overlapping auctions with SSPs or demand partners. In one or more embodiments, the prebid auctions (e.g., client-side and/or server-side using a prebid server) take place prior to allocating ad space inventory to the ad campaigns of the publishers' direct or programmatic partners (e.g., direct bids or guaranteed buys).

Auction data describing the results of the prebid auction (e.g., the identity of winning bidder(s), bid price, creative, category of the creative and/or bidder requirement(s)) are then provided to the allocation management module, which uses the auction data to determine how to allocate the ad space according to business rules that include a revenue yield policy to increase revenue and a competitive separation policy. In one embodiment, the allocation management module can allocate sufficient ad inventory to direct and programmatic partners to satisfy minimum placement terms of agreements, even in cases where doing so allows such partners to purchase ad spaces at prices below the prebid prices.

In one or more embodiments, the prebidding can utilize line items to integrate the results of the prebid auction into the allocation management module's process for allocating ad space inventory. A collection of line items can be generated and stored for each potential participant in the prebid auctions. In one embodiment, the line items for a prebidding partner can include various parameters associated with an ad campaign. For example, when a bid for an ad space is received from a prebid partner, the allocation management module can search for a line item with a "buyer identity" parameter that matches the identity of the prebid partner and/or other line item parameters (e.g., duration) that matches the value of the prebid. The allocation management module then determines whether to allocate the ad space. This determination can be made by applying the allocation management module's business/prioritization rules to the prebid line items that match the prebid(s) and the ad campaign line items that match the ad request including based on revenue yield policy and competitive separation.

In one or more embodiments, price buckets can be utilized in line items where the price bucket represents a range of potential bids. In one embodiment, the line item is matched based on the range of the price bucket value, but the bid price is applied. In one embodiment, the prebid price becomes the price bucket value, such as a bid of $1.98 falling into a price bucket of $2.00 (which covers $1.95–$2.05).

Functions described herein, such as performed by the prebid server or the ad server can be performed by modules (e.g., hardware components, software components, databases, etc.) that can be deployed at one or more data centers in one or more geographic locations, for example. The systems described herein can also include one or more modules for load balancing tools and/or security tools. The load balancing tools can manage traffic within a single data center or between multiple data centers. The security tools can manage data protection and access privilege for tenants served by data centers. The modules can comprise components that can execute on the same or on different individual data processing apparatus. Databases or Cache described herein can reside in one or more physical storage systems.

In one or more embodiments, an allocation manager can allocate portions of a seller's ad space inventory to buyers. A buyer can be an advertiser (e.g., an auto manufacturer, a sportswear company), an ad network, an ad exchange, or an advertising agency, for example. Other buyers are possible. A seller can be a publisher (e.g., a content streaming service, a content distribution company), an online gaming service, an ad exchange, or an ad network. Other sellers are possible.

In one or more embodiments, the allocation manager can allocate the ad space inventory such as in an ad pod of an OTT long form video to buyers (e.g., based on agreements between buyers and the seller of the ad space inventory, based on the results of auctions, etc.), send relevant information to advertisers, return creatives to the browsers or other applications, keep track of billing and usage for advertisers and publishers, and/or enforce frequency capping, brand safety, quality standards, and so forth.

In one or more embodiments, a seller can negotiate with a buyer and reach an agreement on pricing or other terms for running an ad campaign on ad space inventory available from the seller. The seller or the buyer can create (e.g., through an API or a web page) one or more line items (e.g., implemented as data objects) representing the terms of the agreement and store the line items in a line item data database accessible to the ad server. Such line items can be referred to as ad campaign line items.

Alternatively or in addition, a prospective buyer can use prebidding techniques to place bids on an instance of ad space (e.g., during a client-side and/or server-side auction that can take place before rendering the OTT long form video service). The seller or bidders can create (e.g., through an API or a web page) one or more line items (e.g., implemented as data objects) representing the bidders' prebids.

A line item's parameters can include, without limitation, an identifier of a seller, an identifier of a buyer, identifiers of one or more ad spaces from the seller's ad space inventory, ad tags of one or creatives from the buyer's ad campaign, a category of the creative(s), bidder requirement(s) and/or a price/price bucket for filling an instance of an ad space with a creative from the buyer's ad campaign. For ad campaign line items, the value of the price parameter can be a static price based on the terms of the agreement between the buyer and seller. For prebid line items, the value of the price parameter can be dynamic, and can be determined based on the buyer's prebid. A line item can also include flight dates (start and ending dates for the ad campaign) and one or more user target segments.

In one or more embodiments, the allocation manager can use the line items to allocate the ad space inventory among ad campaigns and prebidders. When the allocation manager receives a request to fill an instance of an ad space, the allocation manager compares data associated with the instance of the ad space to the parameters of the line items in the line item data database.

In one or more embodiments, the POP method or portions thereof described herein can be used with or without an ad server, such as in OTT media services. For example in one embodiment, only programmatic demand is provided by a POP method, without any competition with direct demand from an ad server. Yield optimization can be implemented in this example, and in another embodiment competitive separation can be enforced, such as by a prebid server on its own. For example in one embodiment, a Video Multiple Ad Playlist (VMAP) (e.g., in XML format) can be returned from a POP call directly, and an application calling POP, could use a simple tag only.

In one or more embodiments, prefetching can be implemented. In one or more embodiments, the methods described herein or portions thereof (including the POP techniques) can be implemented in conjunction with prefetching of creatives or ads, such as in advance of usage in a stream, for example during a prior ad break to the current ad break (e.g., many seconds before). Various prefetch techniques and timing can be utilized, such as prefetching between 500 milliseconds to 15 minutes in advance of the usage, and/or fetching 1 to N ad pods/breaks in advance.

In one or more embodiments, audience targeting can be implemented. For example in one embodiment, audience targeting parameters can flow throughout the POP process. In one embodiment, audience targeting parameters can be provided by an SSAI server to a POP proxy (e.g., a prebid server) and then in turn next to an ad server (if being utilized—otherwise the audience targeting parameters can be utilized by the POP proxy determining the ad play list). In another embodiment, audience targeting parameters can be provided for CSAI by the video player which can pass these to the POP proxy (e.g., a prebid script executing via the end user device) and then to the ad server. In one or more embodiments, audience targeting enables the advertising to be made relevant and/or personalized to a user, although one or more embodiments described herein can be implemented without audience targeting.

In one or more embodiments, automated script usage in the ad server can be implemented. For example in one embodiment, a method can be implemented to automatically create all of the necessary line items in the ad server representing the mix of price, creative duration, category and/or any other key value (e.g., a bidder requirement). In this embodiment, this can be achieved in a number of different ways such as via a script, which can run in an ad server (e.g., Freewheel or Google Ad Manager) which makes the process more efficient.

In one or more embodiments, the POP method (or portions thereof) can be executed as directly embedded within a (Real-Time Bidding) RTB-based advertising exchange, rather than using a standalone prebid server. In this example, requests for POP bids can be made as part of a global infrastructure (e.g., thousands of servers) and returned in a high-performance manner. In one or more embodiments, the RTB-based advertising exchange can be of various types.

For example in one embodiment, real-time bidding is provided via an open marketplace programmatic auction where ad inventory is sold and bought through a bidding system that occurs in a short time period. In this example, an ad exchange can be utilized which is the platform that connects publishers and advertisers. An RTB auction can be effective for an advertiser because the advertiser can value each opportunity to buy an ad impression in real-time, allowing for accepting or rejecting each ad impression in the campaign. In one or more embodiments, the RTB-based advertising exchange can include components and/or perform functions (e.g., adjusted to work with or in place of one or more components and/or functions in the exemplary embodiments herein) as described in: U.S. Pat. No. 10,262,337 filed Mar. 5, 2010, U.S. Patent Publication 20100268603 filed Mar. 5, 2010, the disclosures of all of which are incorporated herein by reference in their entirety. In one embodiment, a file-based configuration for providing POP parameters can be utilized. In another embodiment, a user interface for providing POP parameters can be utilized. In one embodiment, a combination of a file-based configuration and a user interface for providing POP parameters can be utilized.

In one or more embodiments, the streaming (e.g., OTT streaming) can be of video-on-demand (VOD) or of live streaming. In one or more embodiments, requests for ad pods can be up front for an entire program (e.g., for VOD). In one or more embodiments, a request can be a single request such as a "just in time" request (e.g., right before a live programming break). In one or more embodiments, a request can be for several ad pods in advance (e.g., live or VOD streaming).

In one or more embodiments, the prebid server or one or more functions described with respect to the prebid server can be hosted or managed by various entities, such as a publisher or broadcaster, an SSAI provider, an ad exchange provider, or another third party provider.

In one or more embodiments, prioritization can be controlled or adjusted for different types of demand (e.g., POP (such as prebid) demand vs. direct demand). In one embodiment, POP demand can be configured in an ad server to be a lower priority than direct demand in order to ensure that all guaranteed lines in the ad server can be handled. In this example, direct demand will win first and then any extra demand can be filled via programmatic demand obtained via the POP process. In another embodiment, the POP demand (e.g., candidate bids) can compete on a level playing field with direct demand, in which case POP demand can beat direct demand which may be advantageous for monetization. In one embodiment, the POP process can be applied to OTT media service to implement a yield optimization and a competitive separation policy. In one embodiment, the POP process can be applied to OTT media service to implement a yield optimization without applying a competitive separation policy.

In one or more embodiments, the particular categorization techniques that are utilized to facilitate the competitive separation enforcement can vary. In one embodiment, IAB subcategories can be utilized and/or OpenRTB can be utilized as open standards for the POP techniques described herein. In another embodiment, alternate canonical representations can be utilized for categories other than IAB subcategories.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer,". "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
receiving, by an ad server over a network from an ad insertion server, key value information associated with candidate bid responses for an ad pod of an Over-The-Top (OTT) stream, wherein the key value information is representative of a category of a creative, and wherein the candidate bid responses are determined from among bid responses received within a time deadline from a plurality of platform servers responsive to the ad insertion server providing ad pod information;
determining, by the ad server, an ad play list for the ad pod of the OTT stream according to rules, wherein the rules are enforced based on the category for each of the candidate bid responses; and
transmitting, by the ad server over the network to the ad insertion server, ad play list information representative of the ad play list for the ad pod of the OTT stream, wherein the transmitting the ad play list information enables the ad insertion server to combine content of the OTT stream and creatives associated with the ad play list into the ad pod, resulting in combined content for rendering by an end user device.

2. The method of claim 1, wherein the OTT stream comprises a video stream or an audio stream.

3. The method of claim 1, wherein the key value information is further representative of a price.

4. The method of claim 3, wherein the rules are further enforced based on the price for each of the candidate bid responses.

5. The method of claim 1, wherein the candidate bid responses are determined by a prebid server distinct from the ad server.

6. The method of claim 1, wherein the key value information is received via an ad call.

7. The method of claim 1, wherein the transmitting the ad play list information comprises transmitting the ad play list information in an Extensible Markup Language (XML) response.

8. A non-transitory machine-readable medium, comprising executable instructions that, when executed by a processing system including a processor, facilitate performance of operations, the operations comprising:

obtaining, over a network from an ad insertion server, key value information associated with candidate bid responses for an ad pod of an Over-The-Top (OTT) stream, wherein the key value information is representative of a price, and wherein the candidate bid responses are determined from among bid responses received from a plurality of platform servers responsive to the ad insertion server providing ad pod information;

deriving an ad play list for the ad pod of the OTT stream according to rules, wherein the rules are enforced based on the price for each of the candidate bid responses; and providing, over the network to the ad insertion server, ad play list information representative of the ad play list for the ad pod of the OTT stream, wherein the providing the ad play list information permits the ad insertion server to stitch content of the OTT stream and creatives associated with the ad play list into the ad pod, resulting in stitched content for rendering by an end user device.

9. The non-transitory machine-readable medium of claim 8, wherein the OTT stream comprises a video stream.

10. The non-transitory machine-readable medium of claim 8, wherein the OTT stream comprises an audio stream.

11. The non-transitory machine-readable medium of claim 8, wherein each of the candidate bid responses is based on a bidder requirement.

12. The non-transitory machine-readable medium of claim 8, wherein the candidate bid responses are determined by a prebid server distinct from the processing system.

13. The non-transitory machine-readable medium of claim 8, wherein the key value information is received via an ad call.

14. The non-transitory machine-readable medium of claim 8, wherein the providing the ad play list information comprises providing the ad play list information in an Extensible Markup Language (XML) response.

15. A device, comprising:
a processing system including a processor; and
a memory that stores executable instructions that, when executed by the processing system, facilitate performance of operations, the operations comprising:

receiving, over a network from an ad insertion server, information associated with candidate bid responses for an ad pod of an Over-The-Top (OTT) video stream, wherein the information is representative of a price or a category of a creative, and wherein the candidate bid responses are determined from among bid responses received within a time deadline from a plurality of platform servers responsive to the ad insertion server providing ad pod information;

generating an ad play list for the ad pod of the OTT video stream according to rules, wherein the rules are enforced based on the price or the category for each of the candidate bid responses; and sending, over the network to the ad insertion server, ad play list information representative of the ad play list for the ad pod of the OTT video stream, wherein the sending the ad play list information causes the ad insertion server to combine content of the OTT video stream and creatives associated with the ad play list into the ad pod, resulting in combined content for rendering by a video player.

16. The device of claim 15, wherein each of the candidate bid responses is based on a bidder requirement.

17. The device of claim 16, wherein the bidder requirement is representative of a position in the ad pod.

18. The device of claim 15, wherein the candidate bid responses are determined by a prebid server distinct from the processing system.

19. The device of claim 15, wherein the information is received via an ad call.

20. The device of claim 15, wherein the sending the ad play list information comprises sending the ad play list information in an Extensible Markup Language (XML) response.

* * * * *